May 21, 1963
L. D. LONG
3,090,093
APPARATUS FOR MAKING PRE-CAST CORED
BUILDING BLOCKS
Filed Aug. 25, 1960
13 Sheets-Sheet 1
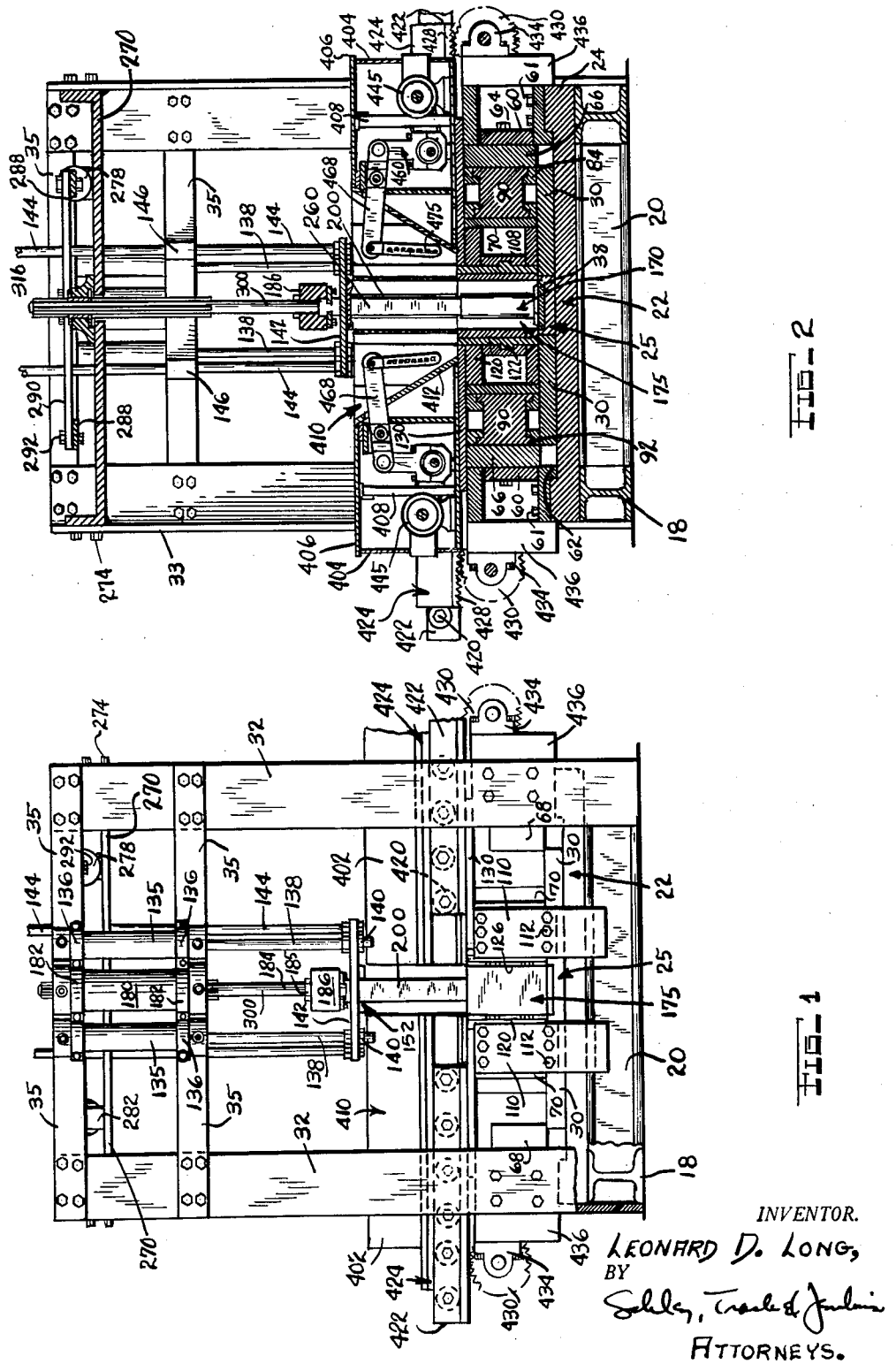
INVENTOR.
LEONARD D. LONG,
BY
Schley, Trask & Jenkins
ATTORNEYS.

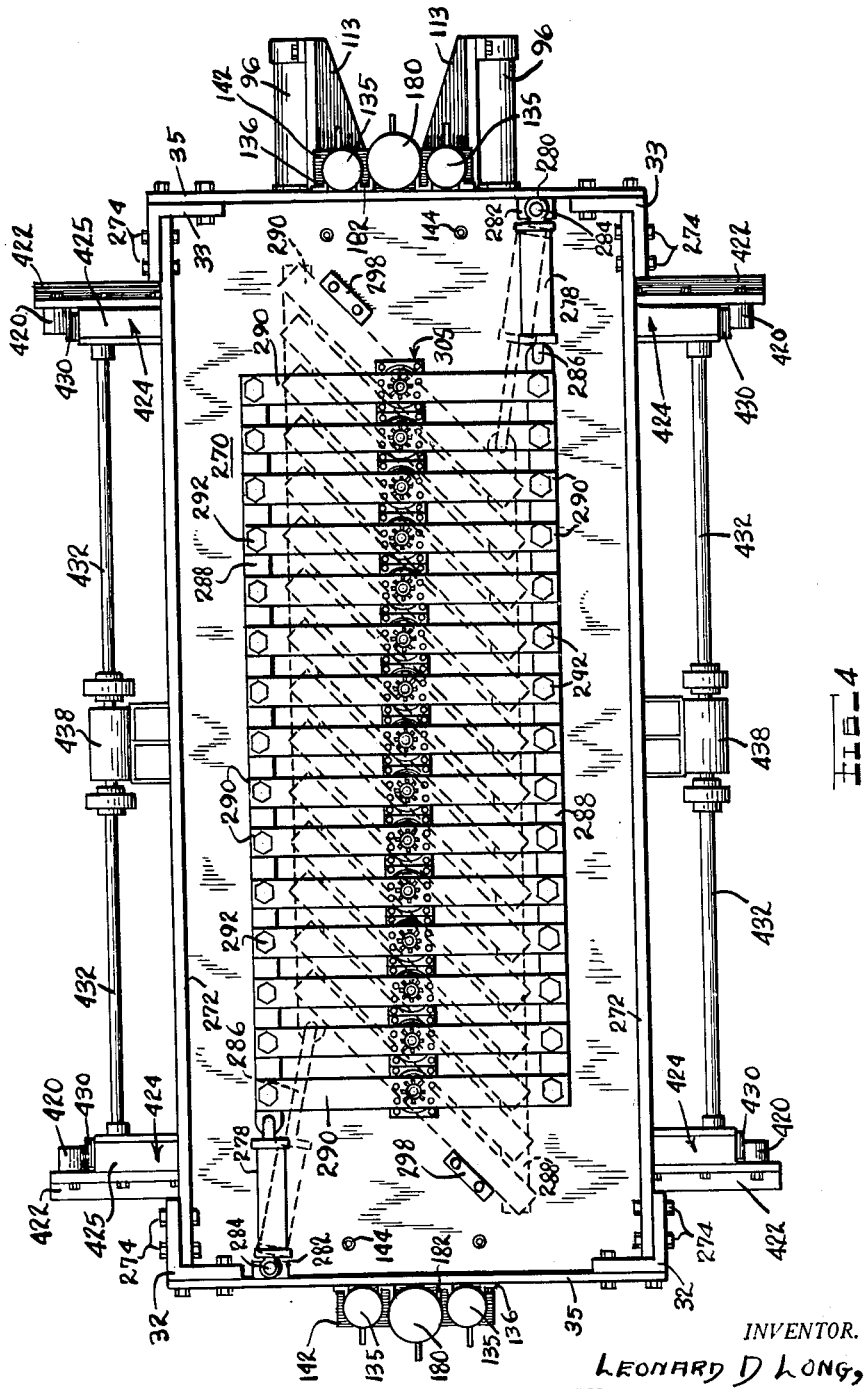

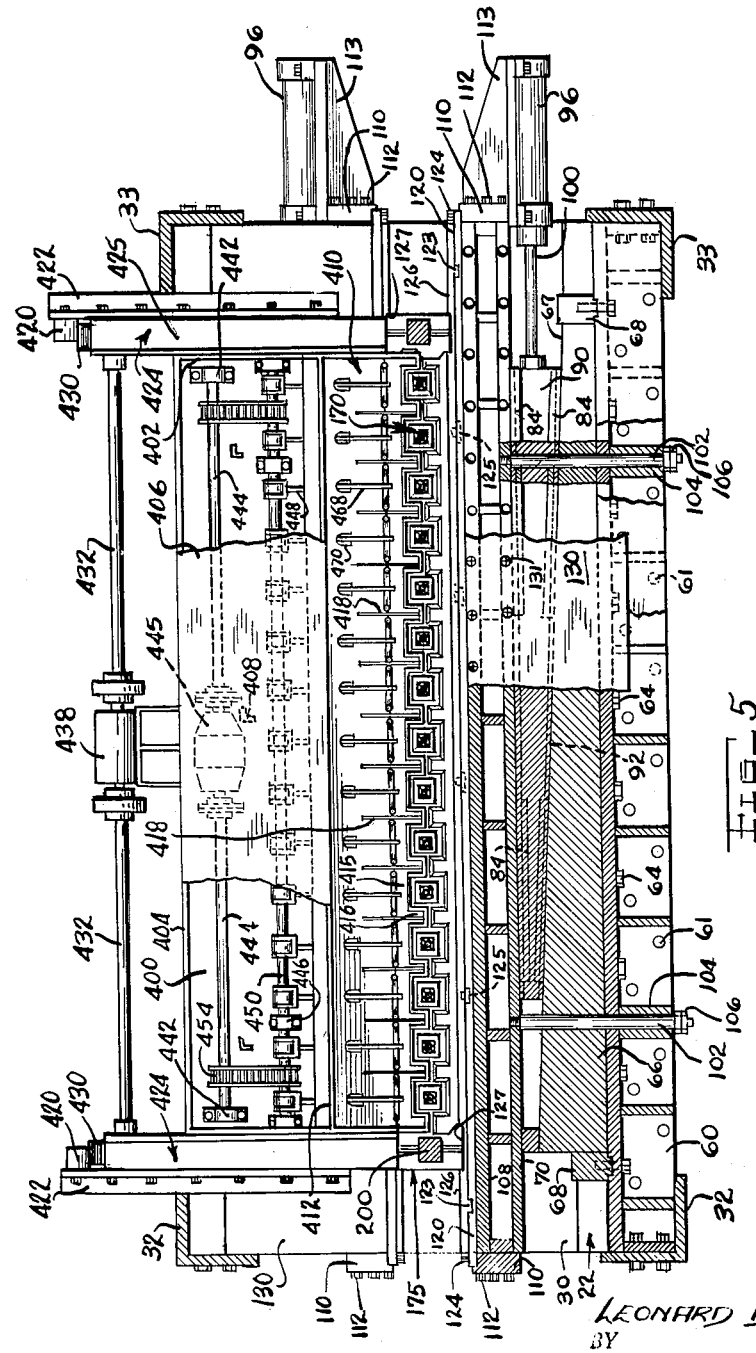

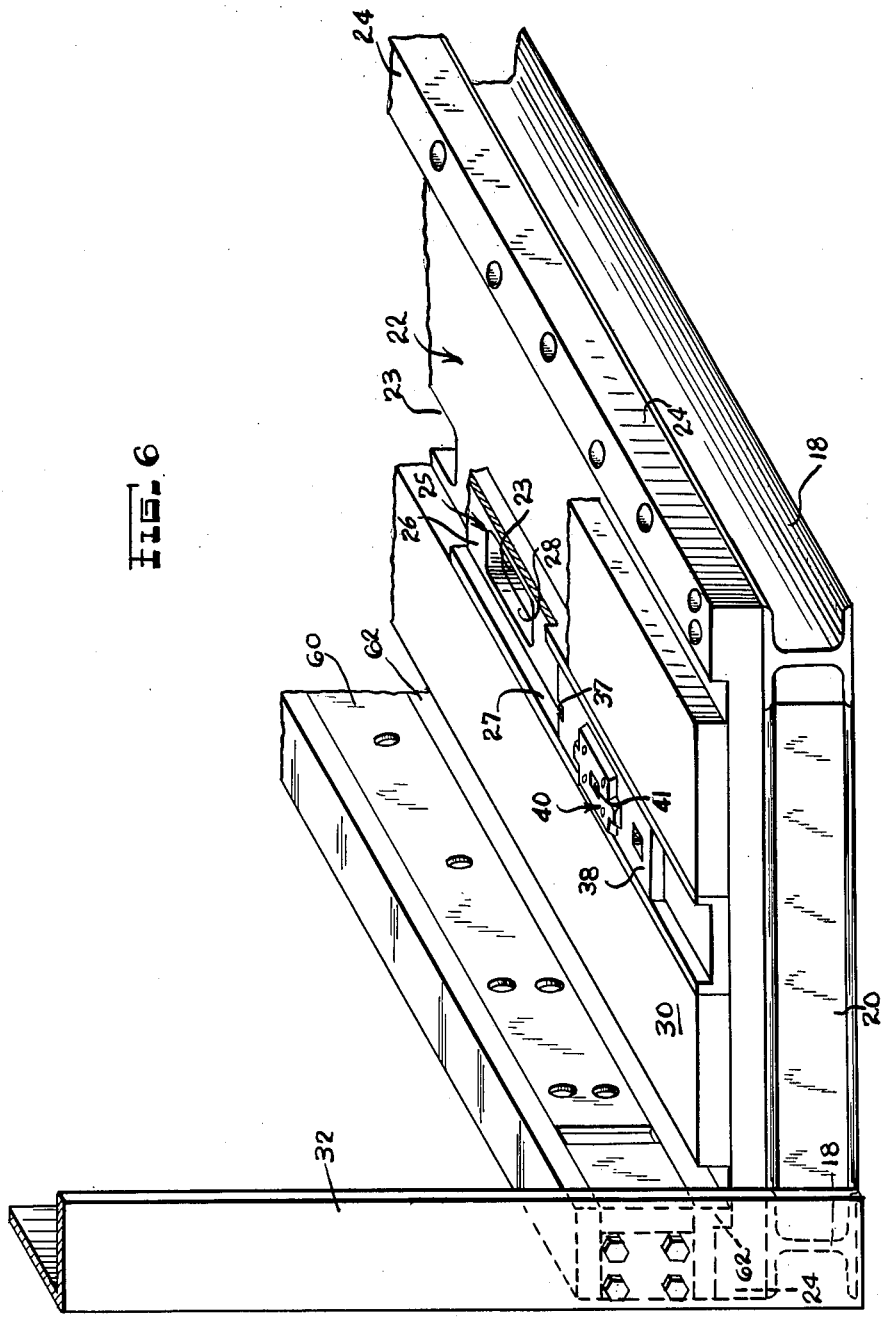

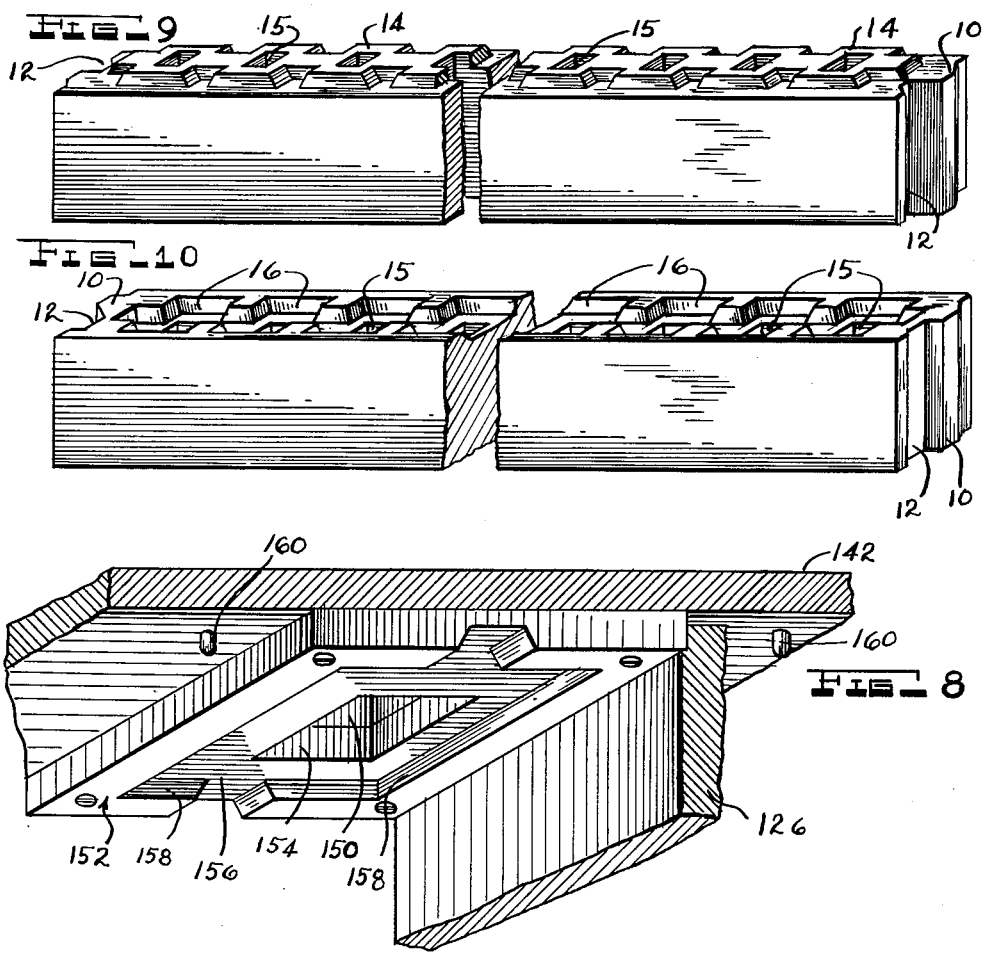

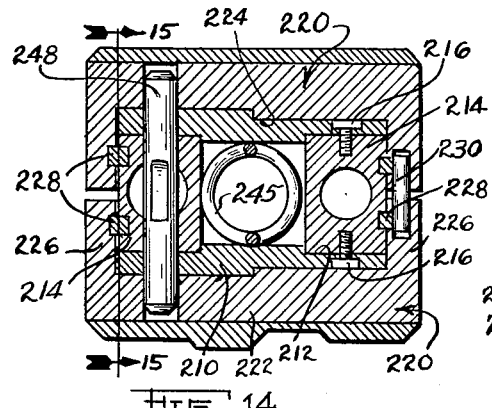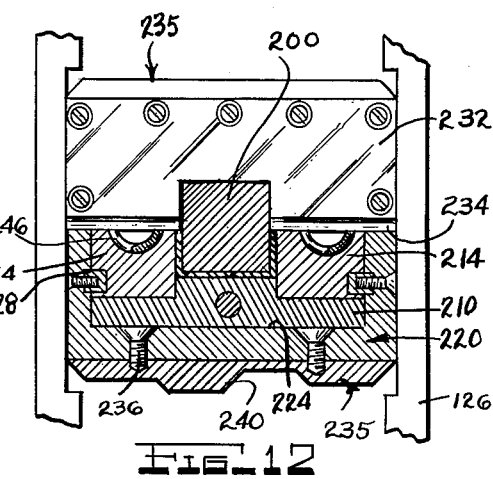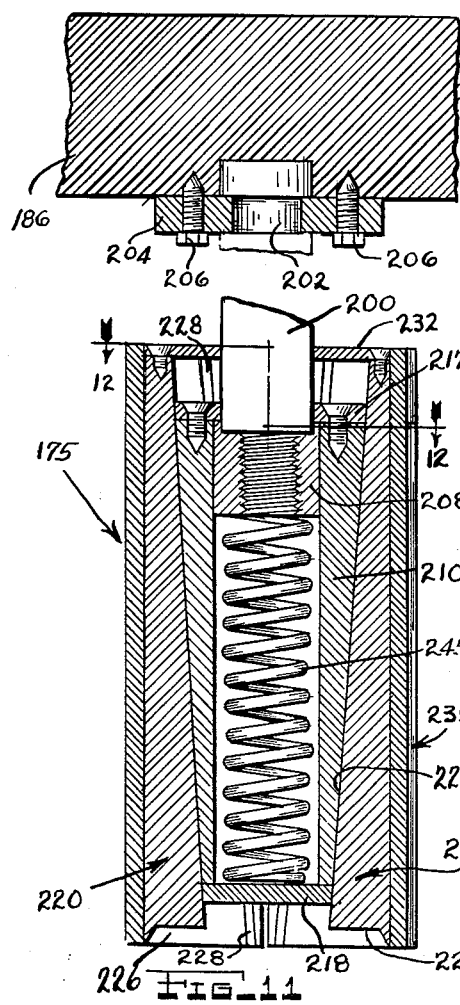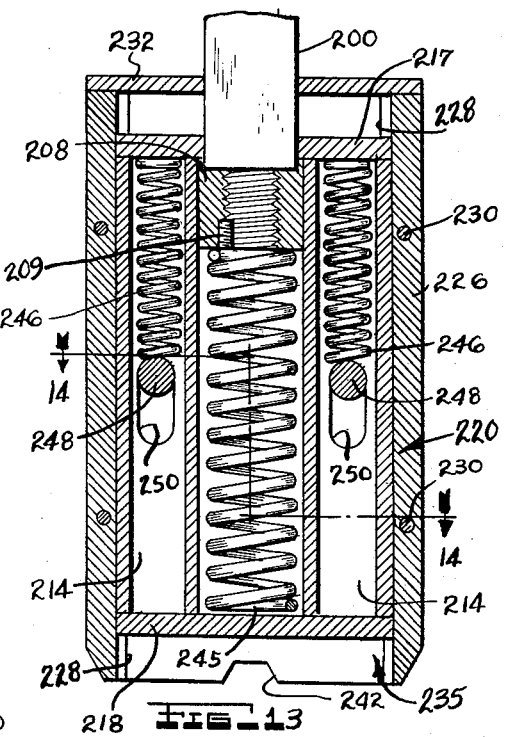

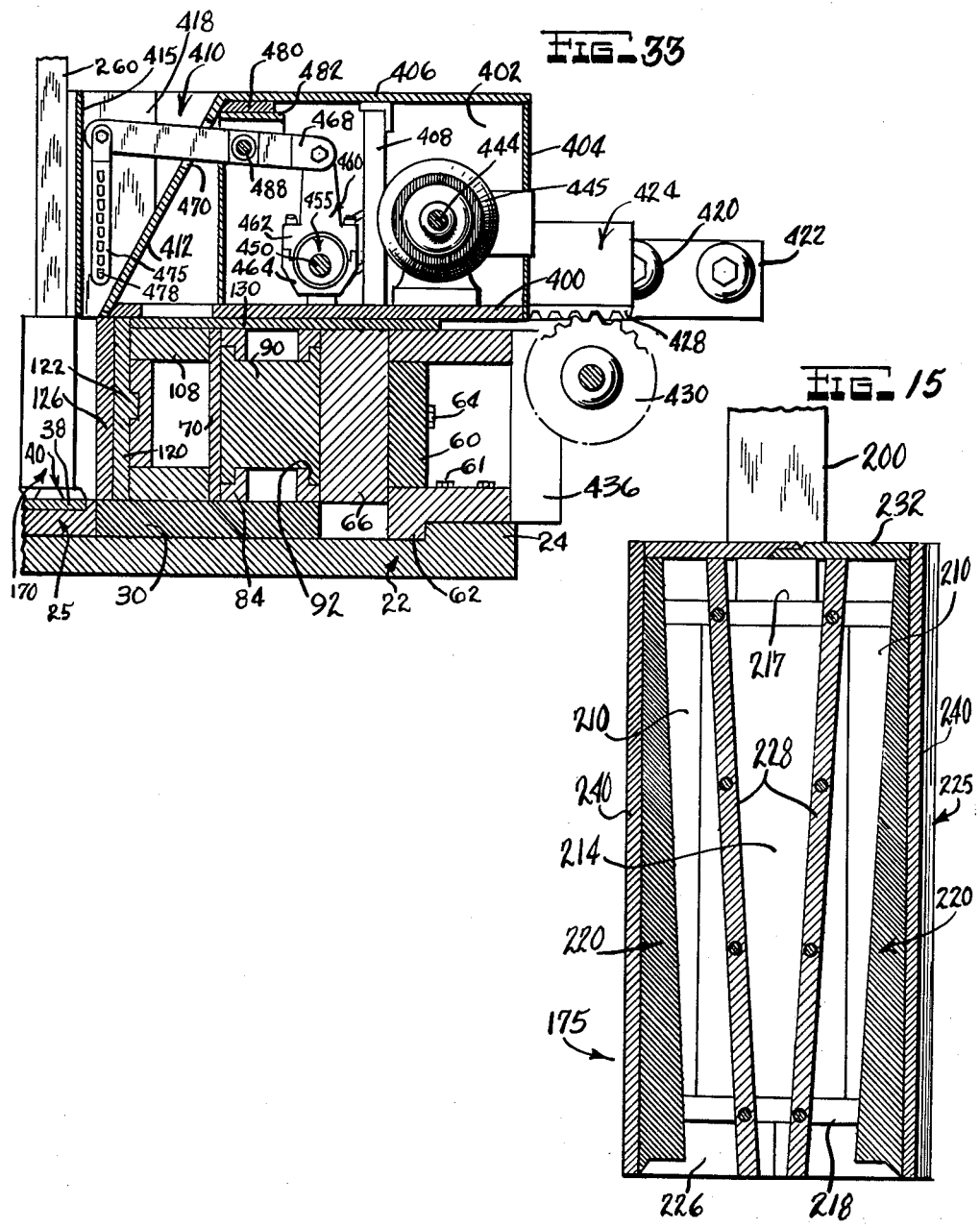

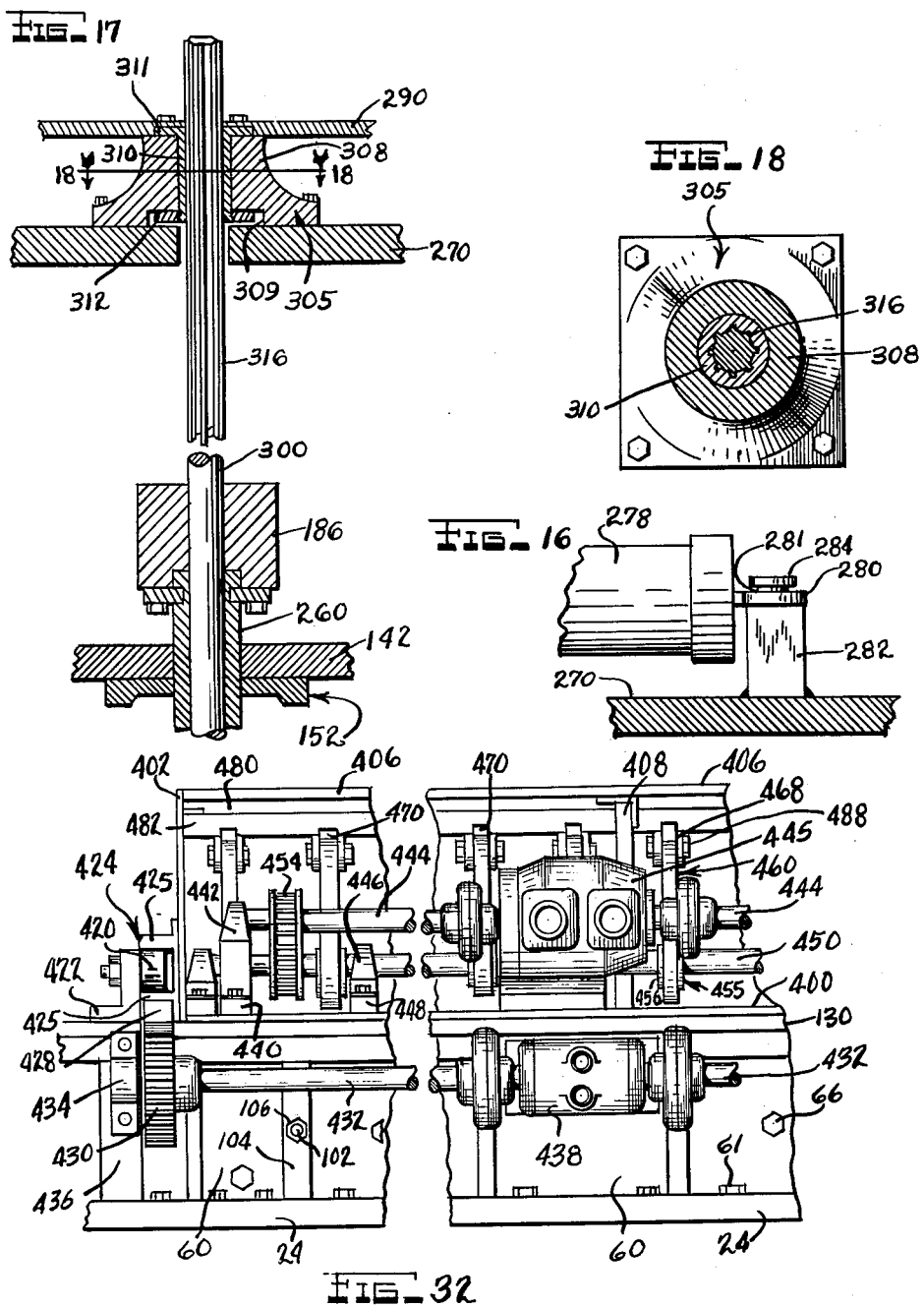

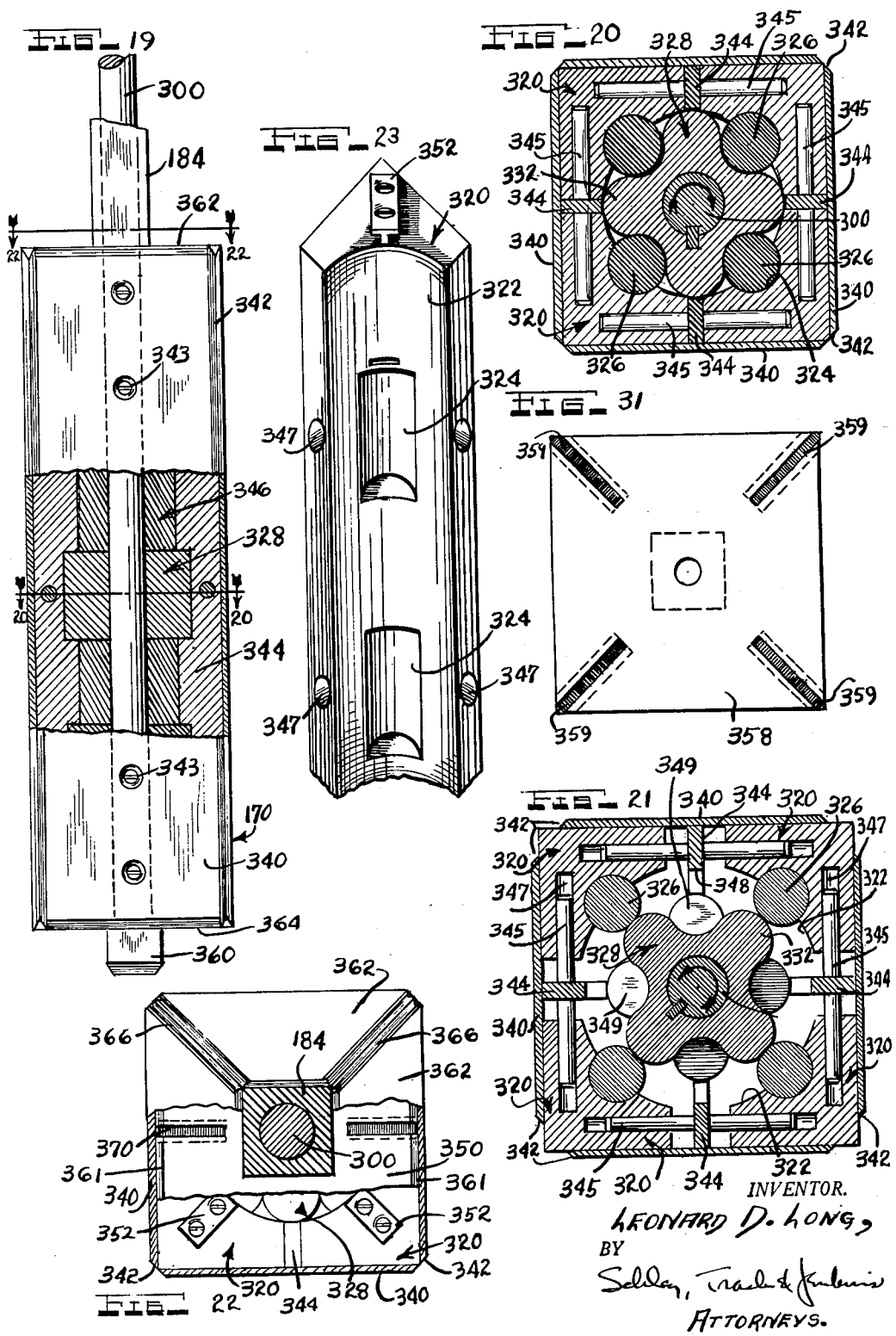

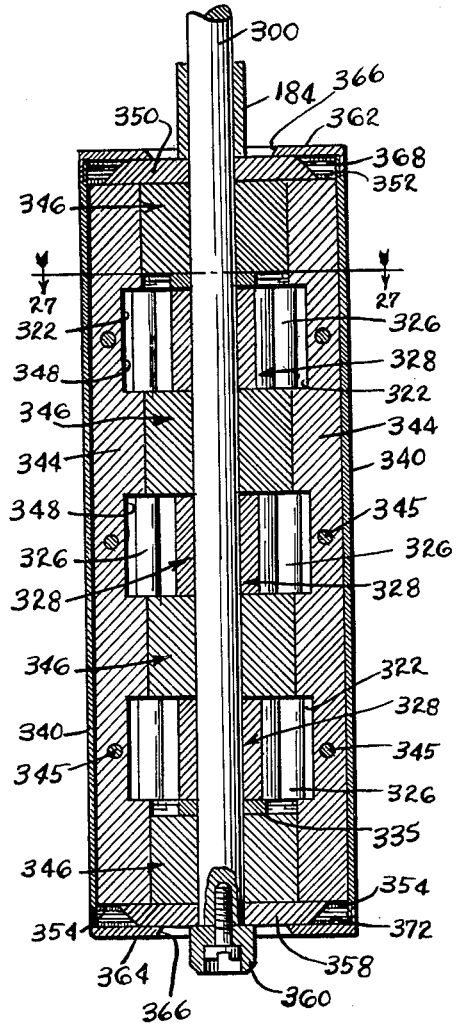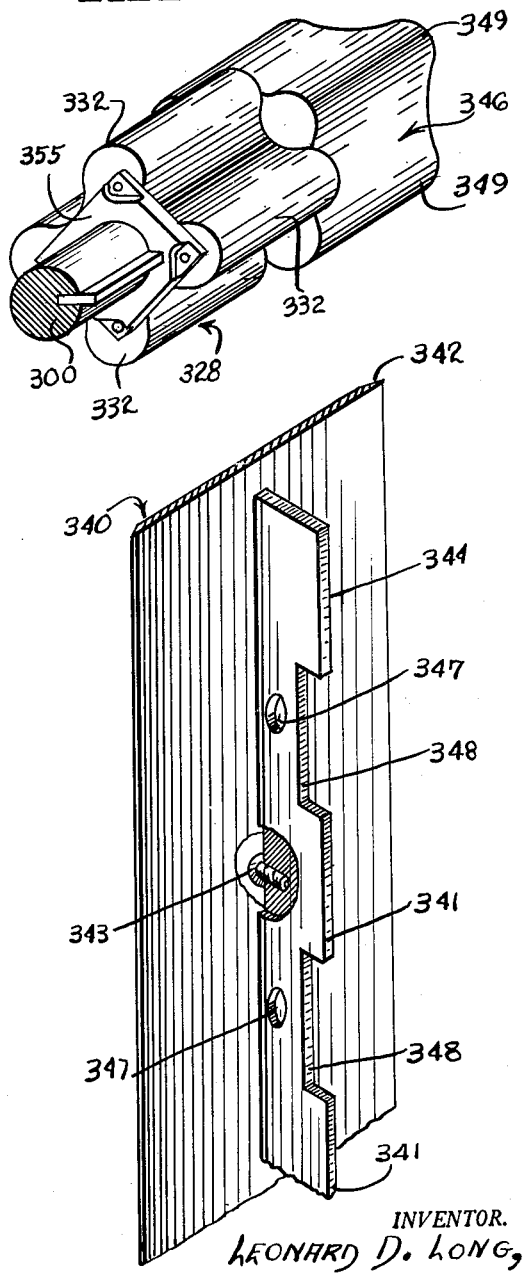

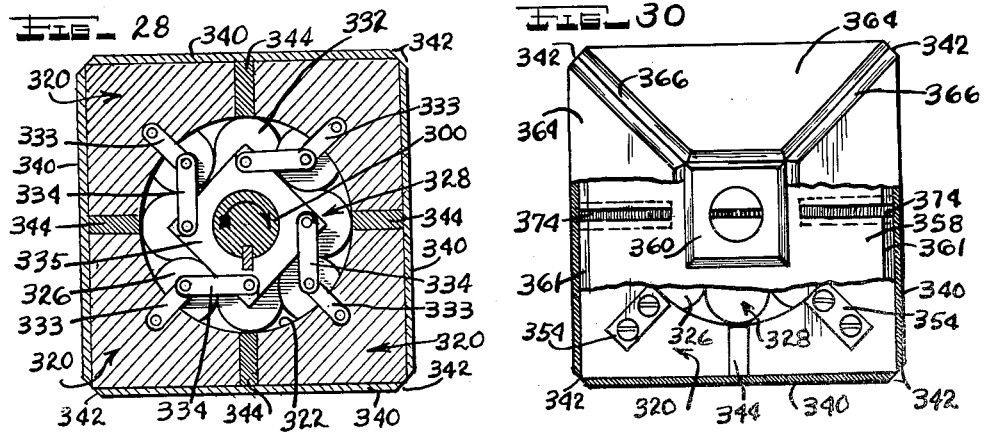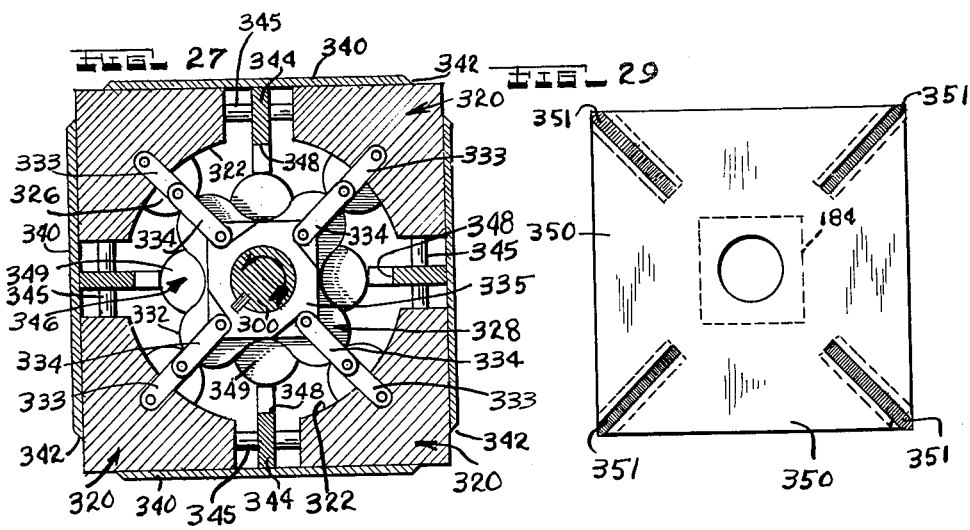

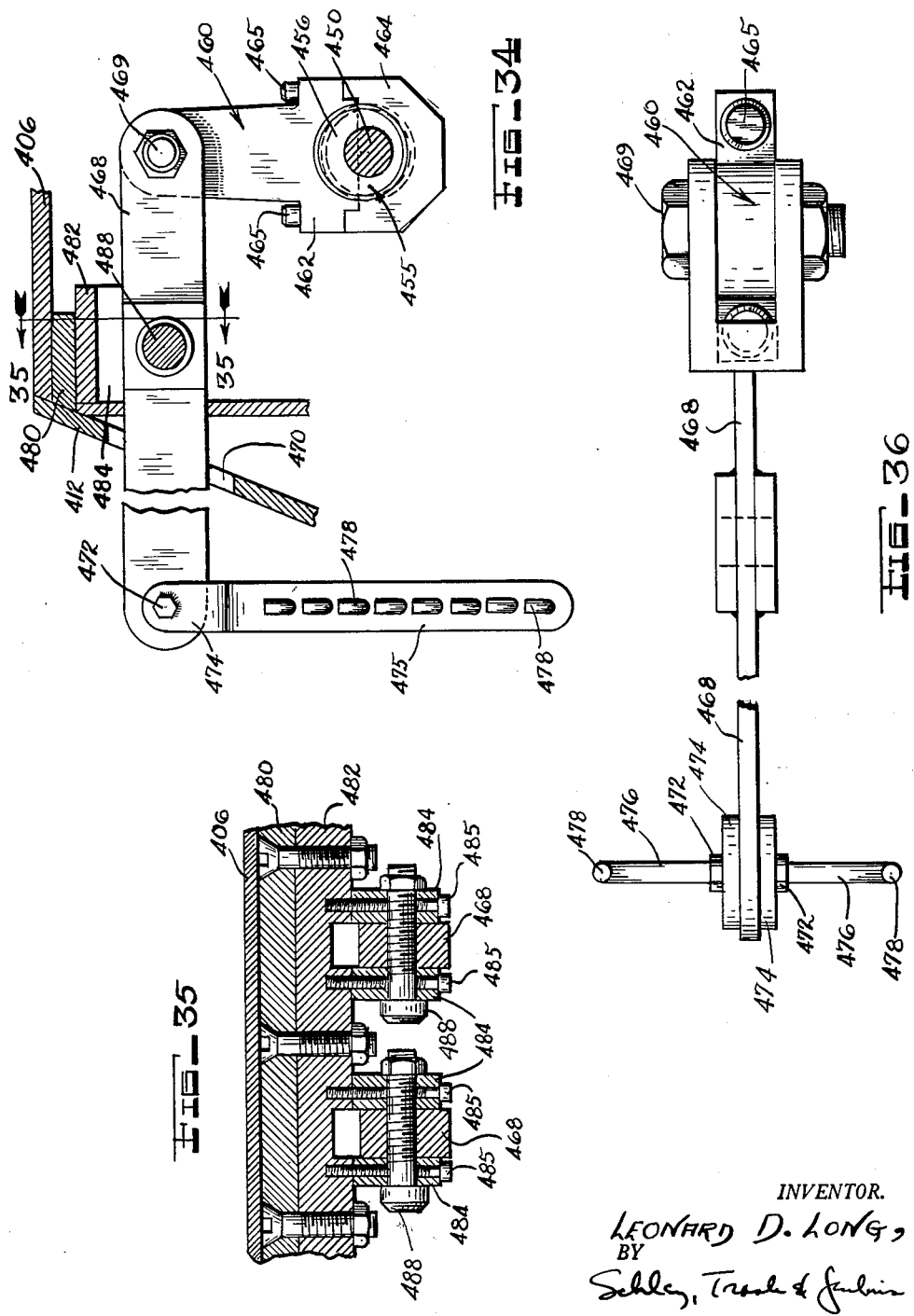

3,090,093
APPARATUS FOR MAKING PRE-CAST CORED
BUILDING BLOCKS
Leonard D. Long, % Long Construction Co., P.O. Box
288, 2110 Mount Pleasant St., Charleston, S.C.
Filed Aug. 25, 1960, Ser. No. 51,972
11 Claims. (Cl. 25—45)

This invention relates to an apparatus for producing pre-cast cored building blocks, and more particularly to an apparatus for producing cementitious pre-cast cored building blocks of the general type commonly referred to as concrete or cinder blocks.

In producing concrete blocks, it has heretofore been the practice to employ machines having molds with fixed sidewalls and fixed dimensional core-forming elements. In such machines, the mold components forming the outer faces of the finished block, except for the component forming the top block face, and the core-forming elements are disposed in operative position; the mold is filled with aggregate; and the mold component forming the top block face is then placed in position. The aggregate is then allowed to set-up and partially cure into a self-sustaining condition and the mold components are withdrawn from the partially cured block. In most such machines, the mold components must be slid along the relatively rough block faces thereby requiring their frequent replacement.

Blocks formed in molds of this type also generally have a relatively low density due to the entrained air in the aggregate forming the block, and generally have wide variations in their external dimensions. This lack of uniformity in the outer dimensions of the blocks produces a corresponding lack of uniformity in the walls or other structures formed from such blocks. Adjusting the amount of mortar between the adjacent blocks tends to overcome the deficiencies in the nonuniformity of the length of such blocks, but where no mortar is used between the ends of adjacent blocks, their lack of uniformity will consequently produce walls or other structures of non-uniform length. Nor will the use of mortar compensate for differences of width in the blocks. Further, this lack of outer dimensional uniformity of the blocks increases the difficulty in keying the blocks together as they are laid up.

While I am aware that it has been proposed in the production of field tile and other such articles having cores formed therein to employ expandable and collapsible core-forming elements, such core-forming elements are generally adapted to be expanded only within fixed limits. That is, such elements are merely adapted to form a hollow core in the article being produced, and after forming such a core, being retracted to permit their withdrawal from the formed element. They are not adapted to expand and compress a mass of aggregate to form a high density pre-cast element substantially void of any network of entrained air cells. Nor are they adapted to produce a building element having a high degree of uniformity in its outer dimensions.

It is an object of my invention to provide an apparatus for making pre-cast building blocks which will be adapted to produce such blocks over a wide range of sizes, which will produce such blocks having the desired patterns and contours formed in their outer faces, which will produce relatively high density blocks, and which will produce blocks having a high degree of uniformity in their outer dimensions within the size range of blocks being produced. It is a further object of my invention to provide an apparatus for producing pre-cast building blocks in quantity and wherein the molding cycle for producing such blocks will require a minimum of time.

In carrying out my invention in its preferred form, I provide an apparatus comprising a frame having a base adapted to support a palette forming the bottom of the block mold. A pair of mold sidewall assemblies are disposed on the base and are movable into operative positions such that they accurately define the lateral dimensions of the block being produced. A longitudinally extending beam is mounted on the frame above the base and carries a plurality of end-formers adapted to be lowered into operative position between the sidewall assemblies to form the end faces of the block being produced. Conveniently, the end-formers are expandable such that the distance between their opposed faces is controllable to accurately define the length of the block being produced.

The cores in the block are formed by a plurality of expandable core-formers adapted to be disposed between the sidewall assemblies of the mold. Each of the core-formers is provided with a plurality of core segments having inwardly presented thrust-receiving faces which are operatively engaged by cam means mounted on a shaft interposed between the core segments and rotatable to cause said cam means to move the core segments into spaced relation to each other for expanding the core-former. Conveniently, a plurality of face plates are mounted on each of the core-formers to close the spaces between adjacent core segments to prevent the entrance of aggregate into the core-former when it is in expanded position.

Conveniently, the core-formers are supported from the beam carrying the end-formers and are vertically movable therewith to and from operative positions within the mold. The means interconnecting each of the core-formers to said beam is provided with means for supporting said core-former in fixed axial position on its rotatable shaft and preventing the core segments from rotating with said shaft during the expansion and contraction movements of the core-former. The rotatable shafts extend through the longitudinally extending beam and the means supporting the core-formers thereon to a power table mounted on the supporting frame. Said power table is provided with means for rotating all the shafts simultaneously through equal angles of rotation during expansion and contraction of the core-formers for effecting such expansion and contraction.

The top of the mold is closed by a vertically movable top palette carried from the supporting frame. Conveniently, the top palette is disposed in a horizontal plane above the end and core-formers and is provided with a plurality of openings for the reception of the means interconnecting said end and core-formers to the longitudinally extending beam imparting the vertical movements thereto.

Preferably, a screed floor is disposed above each of the mold sidewall assemblies and extends laterally outwardly therefrom. Each of the screed floors supports an aggregate bucket extending the length of the mold for discharging the aggregate into the mold cavity. To this end, the aggregate buckets are movable from retracted positions disposed laterally outwardly from the mold to operative positions in which their inner opposed faces abut each other along the longitudinal axis of the mold. In this inwardly disposed operative position the aggregate buckets discharge the aggregate into the mold cavity around the core-formers between the opposed end-formers and the opposed sidewall members for filling the mold cavity. After thus filling the mold cavity, the aggregate buckets may be withdrawn from the top of the mold cavity to permit the top palette to be lowered into an operative position closing the top of the mold cavity.

Other features and objects of my invention will become more apparent from the more detailed description which follows and from the accompanying drawings, in which:

FIG. 1 is an end elevation of a block-making apparatus embodying my invention;

FIG. 2 is an end elevation similar to FIG. 1, but with portions of the apparatus being shown in section;

FIG. 4 is a top plan view of the apparatus shown in FIG. 1;

FIG. 5 is a horizontal section of the apparatus shown in FIG. 1, but with portions thereof broken away to show the details of one of the aggregate bucket assemblies and one of the sidewall assemblies;

FIG. 6 is a fragmentary isometric view of the bottom palette and base assemblies;

FIG. 7 is a fragmentary isometric view of the bottom palette;

FIG. 8 is a fragmentary isometric view of the top palette;

FIG. 9 is a fragmentary isometric view of a block produced in the apparatus shown in FIG. 1;

FIG. 10 is a fragmentary isometric view of the block shown in FIG. 9, but showing said block in inverted position;

FIG. 11 is a vertical section taken on the longitudinal axis of one of the expandable end-formers;

FIG. 12 is a horizontal section taken on the line 12—12 of FIG. 11;

FIG. 13 is a vertical section taken on the transverse axis of the end-former shown in FIG. 11;

FIG. 14 is a horizontal section taken on the line 14—14 of FIG. 13;

FIG. 15 is a vertical section taken on the line 15—15 of FIG. 14;

FIG. 16 is a fragmentary view of the power table showing the method of mounting thereon the cylinders for expanding the core-formers;

FIG. 17 is a fragmentary vertical section taken on the line 17—17 of FIG. 3 and showing one of the thrust-transmitting means for expanding the core-formers;

FIG. 18 is a horizontal section taken on the line 18—18 of FIG. 17;

FIG. 19 is a side elevation of one of the core-formers with portions thereof broken away;

FIG. 20 is a horizontal section taken on the line 20—20 of FIG. 19;

FIG. 21 is a horizontal section taken on the line 20—20 of FIG. 19, but showing the core-former in expanded position;

FIG. 22 is a horizontal section taken on the line 22—22 of FIG. 19, but with portions being broken away;

FIG. 23 is an enlarged fragmentary isometric view of one of the core segments shown in FIG. 20;

FIG. 24 is a vertical section of the core-former shown in FIG. 19, but showing said core-former in expanded position;

FIG. 25 is an enlarged fragmentary isometric view of the core-former cams shown in FIG. 24;

FIG. 26 is an enlarged fragmentary isometric view of one of the face plates shown in FIG. 24;

FIG. 27 is a horizontal section taken on the line 27—27 of FIG. 24;

FIG. 28 is a horizontal section similar to FIG. 27, but showing the core-former in collapsed position;

FIG. 29 is a bottom plan view of the spider plate shown in FIG. 22;

FIG. 30 is a bottom plan view of the core-former shown in FIG. 19, but with portions thereof being broken away;

FIG. 31 is a top plan view of the pilot plate shown in FIG. 30;

FIG. 32 is a fragmentary rear elevation of one of the aggregate buckets with the back cover removed therefrom;

FIG. 33 is a vertical section of the aggregate bucket shown in FIG. 32, and showing said bucket in operative position;

FIG. 34 is an enlarged fragmentary vertical section of the aggregate bucket showing one of the agitators;

FIG. 35 is a vertical section taken on the line 35—35 of FIG. 34; and

FIG. 36 is a top plan view of the agitator shown in FIG. 34.

Figure 3:
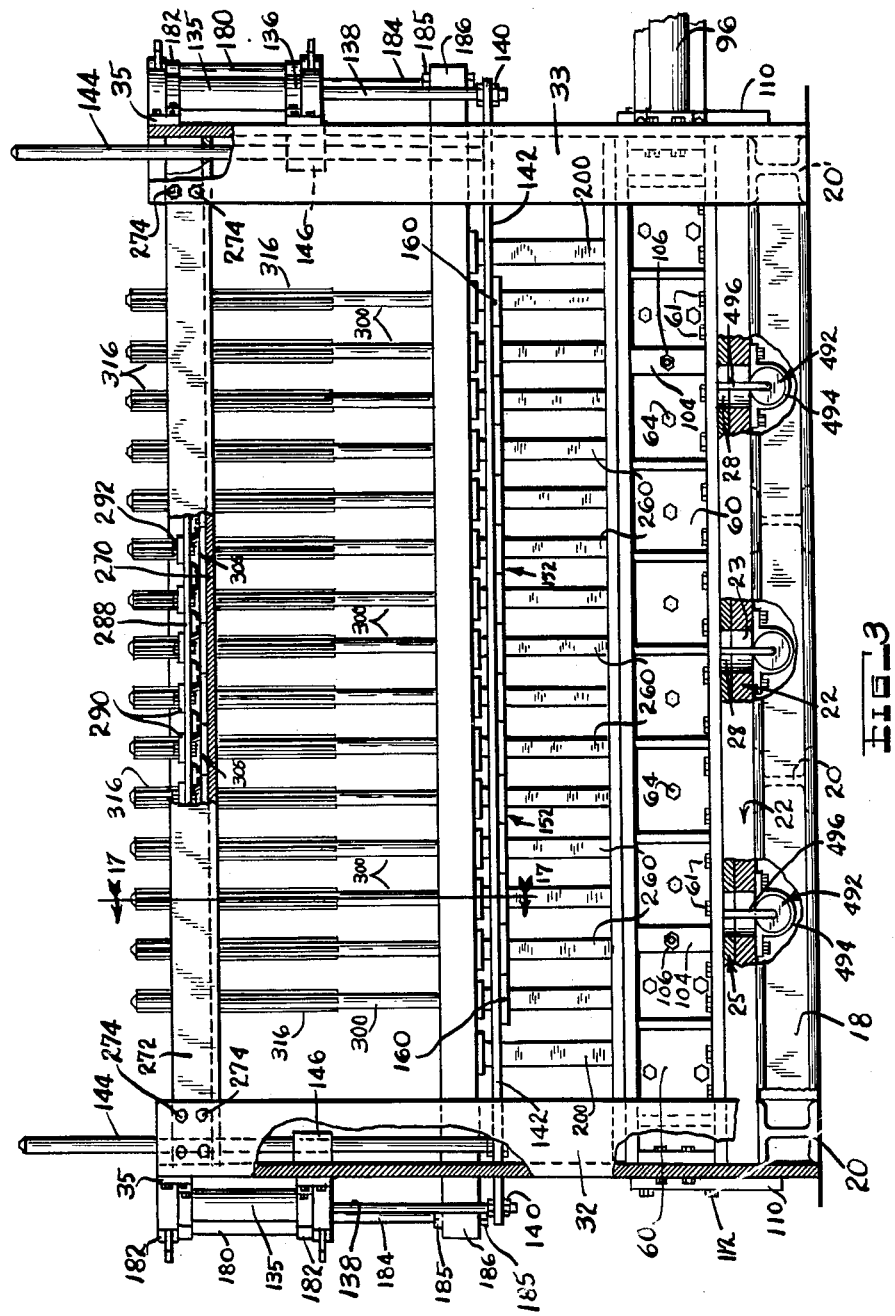
FIG. 3 is a side elevation of the apparatus shown in FIG. 1, but with the aggregate bucket assemblies removed therefrom.

My apparatus is adapted to produce pre-cast cored concrete blocks having a high density and an extremely high degree of external dimensional uniformity. For example, concrete blocks produced in my apparatus have tolerances of less than 1/64 of an inch on blocks of 8 foot lengths. By making blocks with such a high degree of dimensional uniformity, I am able to lay up walls and other structures with precise lengths and thicknesses. I am further able to lay up such walls without the use of mortar between the adjacent faces of adjacent blocks, and may employ keys and keyways on the outer block faces so that the blocks may be laid up in an interlocking relationship. As shown in FIGS. 9 and 10, such a block may be provided with a vertically extending key 10 and keyways 12 at each of its ends and with mating keys 14 and keyways 16 on its top and bottom faces respectively, the keys 14 and keyways 16 bordering spaced cores 15 extending through the block. I have found that the small tolerances in the outer dimensions of my blocks make it possible to lay up a wall of such blocks about four or five feet high without the use of mortar, the mating keys and keyways in faces of adjacent blocks holding the blocks interlocked together. In laying the blocks, the cores 15 are disposed in vertical alignment so that concrete may be poured down the columns formed by the aligned cores of the blocks to form a truly rigid structure. Due to the interlocking relationship between the blocks, it is necessary to pour such concrete columns down the aligned cores at only every fifth or sixth core column. Also, as previously stated, such columns need not be poured until a wall of blocks about four or five feet high has been laid.

Furthermore, the blocks produced in my apparatus have an extremely high density with substantially no internal air voids. This results in an extremely strong block being produced, and it permits the production of blocks having a height of at least twelve inches, as compared to the conventional 8-inch height of blocks formed in machines previously available.

As illustrated, my apparatus for producing such blocks comprises a base frame having pluralities of longitudinally and transversely extending beams 18 and 20, conveniently in the form of interconnected steel I-beams. Rigidly mounted on said beams is a horizontally disposed base 22 having openings 23 formed therein and extending therethrough. As shown in FIG. 6, the base 22 is provided with a pair of longitudinally extending ribs 24 along its lateral edges. An elongated channeled palette guide 25 having a central web 26 integrally joined at its edges to a pair of legs 27 is mounted on the upper face of the base, said web having a plurality of openings 28 overlying the openings 23 in the base. The palette guide is braced against lateral movement on the base 22 by a pair of blocks 30 mounted on said base on either side of the palette guide with their inwardly presented faces abutting the outer faces of the guide legs 27. Conveniently, the several base components are rigidly joined together by bolts, with the base 22 being secured to the beams 18 and 20 as by welding.

Two pairs of vertically extending opposed L-shaped end frames 32 and 33 are rigidly connected, as by welding, to the base 22 at each of its corners. As shown in FIG. 1, each pair of the end frames 32 and 33 is interconnected and cross-braced adjacent their upper ends by a pair of vertically spaced cross members 35 bolted to the outer end faces of said end frames. Thus, the cross-braced end frames 32 and 33 form a supporting frame extending above the ground-engageable base frame.

The mold for forming the blocks is carried on the base frame and comprises an elongated bottom palette 38 slidable along the palette guide 25 and forming the bottom face of the block. The palette is slightly longer and wider than the block to be produced, and is provided with a plurality of spaced openings 37 adapted to overlie the aligned openings in the several base components. As shown in FIGS. 6 and 7, a series of plates 40 apertured as at 41 and having beveled edges 42 are mounted on the bottom palette 38, as by screws 44, to form the keyways 16 in the block bordering the cores 15. The plates are mounted on the bottom palette 38 with their adjacent ends in abutting relationship and their apertures 41 in alignment with the openings 37 in the bottom palette. Desirably, the number of plates 40 mounted on the palette 38 corresponds to at least the number of cores 15 to be produced in the block. However, in some instances it may be desirable to form a patterned recess in the block adjacent the ends thereof, in which case one of the plates will be mounted on the palette to underlie each of the end-formers. Both the number and configuration of the plates 40 will depend of course upon the configuration of the key pattern to be produced in the block faces.

Conveniently, the palette 38 may be slid along the palette guide into and out of an operative position between the opposed pairs of end frames 32 and 33 by a second palette abutting at the end of the palette 38. To facilitate such insertion and withdrawal of the palette 38 into and out of the apparatus, it may be desirable to dispose a roller conveyer at each end of the apparatus upon which the palette 38 may ride. It may be further desirable to mount a hydraulic cylinder at the end of one of the conveyers to push said second palette along one of the conveyers so that that second palette can push the palette 38 into an operative position between the end frames 32 and 33, and then out of the apparatus onto the second conveyer when said second palette is pushed into operative position. This, however, does not constitute a part of my invention, and is thus omitted from the drawings.

As shown in FIG. 5, the sidewalls of the mold are formed by a pair of identical but opposed sidewall assemblies mounted along the opposite sides of the base structure. The assemblies are identical in construction and operation; and thus, only one such assembly will be described. Each of said sidewall assemblies comprises a back-up beam 60 rigidly connected, as by bolts 61, to the pairs of opposed end frames 32 and 33 and to the upper face of one of the base ribs 24. The back-up beam 60 and base 22 are further interconnected to prevent their relative movement by means of a longitudinally extending key 62 received in the space between one of the base ribs 24 and the adjacent palette guide block 30. Mounted along the inner face of the back-up beam, as by bolts 64, is a wedge beam 66 having its inner face 67 oblique to the longitudinal axis of the base 22. Conveniently, a pair of stop-blocks 68 are mounted on the inner face of the back-up beam 60 to abut the ends of the wedge beam 66 to further insure against the relative longitudinal movement of the back-up and wedge beams. Spaced inwardly from the wedge beam 66 is a longitudinally extending side plate 70 having parallel side faces parallel to the longitudinal axis of the base 22. A plurality of longitudinally extending L-shaped gibs 84 are rigidly mounted on the opposed faces of the side plate 70 and the wedge beam 66 at the upper and lower edges thereof. One of the legs on each of said gibs is spaced from the adjacent face of the side plate or wedge beam to which it is mounted to thus define longitudinally extending channels extending along the opposed faces of said wedge beam and side plate at the upper and lower edges thereof.

Longitudinally slidable in the space between the side plate 70 and the wedge beam 66 is a tapered wedge 90 having ribs 92 at each of its corners which extend the length thereof and are slidably received in the channels formed by the gibs 84 and the opposed faces of the side plate 70 and wedge beam 66. The wedge 90 has a tapered outer face corresponding to the tapered wedge beam face 67, and an inwardly disposed face parallel to the outwardly disposed face on the side plate 70. The wedge 90 has a slightly greater lateral extent than the space between the side plate and wedge beams, so that with the wedge beam being fixed with respect to the base 22 by means of the back-up beam 60, longitudinal movement of the wedge to the left, as viewed in FIG. 5, will cause the side plate to move laterally inwardly toward the longitudinal axis of the base 22. Conversely, as the wedge 90 is moved to the right, as viewed in FIG. 5, the wedge ribs 92 will cause the gibs 84 on the side plate 70 to pull said side plate laterally outwardly away from the longitudinal axis of the base 22. Conveniently, the wedge 90 is movable longitudinally with respect to the base by means of a hydraulic cylinder 96 having a ram 100 connected to one end of the wedge 90 in any convenient manner so as to cause said wedge to move longitudinally with respect to the base 22 upon actuation of said cylinder.

As shown in FIG. 5, the lateral movements of the side plate 70 by the wedge 90 are guided and limited by a pair of spaced guide rods 102 having their inwardly disposed ends threadably received in the outer face of the side plate 70. The guide rods 102 extend through the wedge beam 66 with their opposite ends received in transversely extending sleeves 104 provided on the back-up beam 60. As shown in FIG. 5, one of the pair of guide rods 102 interconnects the back-up beam 60 and side plate 70 beyond the end of the stroke of the wedge 90, but the other of said pair of guide rods lies within the extent of the wedge movements, and it thus extends through a longitudinally extending slot formed in the wedge to permit said wedge to be moved through its actuating strokes. The ends of the rods projecting outwardly beyond the back-up beam have nuts 106 threadably received thereon, so that upon inward movement of the side plate 70, the nuts 106 will abut the outer faces of the sleeves 104 to limit the inward movement of the side plate 70.

It is desirable to be able to produce blocks having different lengths, and/or blocks having different patterns and contours formed in their side faces. It is also desirable to be able to quickly change from the production of blocks having one such design to another without having to disassemble and reassemble a large number of components on the machine. To this end, I mount a side beam 108 on the inner face of the side plate 70. The side beam 108 extends the length of the side plate 70 and is connected thereto by end brackets 110 mounted on the ends of the side beam and side plate as by bolts 112. Conveniently, the pair of brackets 110 adjacent the end frames 33 also support a pair of brackets 113 carrying the hydraulic cylinders 96 which drive the wedges 90. Mounted on the inner face of the side beam 108 and extending the length thereof is a sub-plate 120. Conveniently, the sub-plate 120 is keyed to the side beam 108, as at 122, and is further interconnected to said side beam by means of bolts 124 received in the brackets 110. The inwardly presented face of the sub-plate is keyed, as at 123, to a longitudinally extending sidewall or face plate 126 adapted to form one of the sidewalls of the block being produced. The sub-plate and sidewall 126 are also interconnected by a plurality of bolts 125 which extend inwardly from the sub-plate 120, but do not project through the sidewall 126 so that they do not alter the configuration of the inner face of the sidewall. For reasons that will become more apparent hereinafter, the sidewall 126 is provided with vertically extending keyways 127 at spaced points along its length. In each of the sidewalls shown in FIG. 5, two such keyways are employed, one being disposed adjacent each end of each sidewall.

Thus, upon actuation of the sidewall assemblies, the opposed pair of sidewalls 126 will be moved toward or away from each other by the wedges 90 to provide the desired spacing between their opposed faces and thereby define the width of the block being produced. This lateral movement of the sidewalls is adjustably controllable by the amount of longitudinal wedge movements and by the guide rods 102. With the several components disposed inwardly of the wedges 90 being interconnected by the brackets 110, all of the sidewall assembly components disposed inwardly of said wedges will thus be moved laterally inwardly and outwardly upon longitudinal movement of the wedges by the cylinders 96.

For reasons that will become more apparent hereinafter, a floor 130 is mounted on the upper faces of each of the side beams 108 and side plates 70, as by bolts 131, and is thus movable therewith. The floors 130 extend the length of the sidewall assemblies, with their inner edges abutting the sub-plates 120 and their upper faces being coplanar with the upper faces of the sub-plates 120 and the sidewalls 126.

As shown in FIGS. 2 and 3, the end frames 32 and 33, together with their cross braces 35 support core-former and top palette assemblies along the longitudinal axis of the apparatus in positions such that their various components may be readily actuated to carry out the sequences necessary for forming pre-cast cored blocks. To this end, I mount a pair of laterally spaced vertically extending hydraulic cylinders 135 on each end of the apparatus. The upper and lower ends of each of the cylinders 135 are connected to brackets 136 secured to the cross braces 35 for rigidly mounting said cylinders on the supporting frame. Each of the cylinders 135 is provided with a downwardly extending ram 138 connected at its lower end, as by nuts 140 to a horizontally disposed top palette 142. As shown in FIGS. 2 and 3, the top palette 142 has a lateral extent greater than the spacing between the opposed sidewall assemblies in their operative positions, and a length slightly longer than the length of the apparatus to afford a connection between the rams 138 and the top palette outside the extent of the end frames 32 and 33.

As will be understood, actuation of the cylinders 135 causes the rams 138 to move the top palette vertically with respect to the mold cavity formed by the sidewall assemblies and the bottom palette 38. The vertical movement of the top palette is guided by a plurality of vertically extending guide rods 144 mounted on the top palette adjacent each of its corners. The guide rods 144 extend upwardly from the top palette 142 and are slidably received in guide blocks 146 mounted on the inner faces of the lower pair of cross braces 35 to thus guide the vertical movements of the top palette.

As shown in FIG. 8, the top palette 142 is provided with a plurality of spaced openings 150 formed along its longitudinal axis in alignment with the openings 37 and 41 in the bottom palette 38 and plates 40, respectively. A plurality of apertured plates 152 are mounted on the lower face of the top palette 142 with the aperture 154 in each of said plates being disposed in alignment with one of the openings 150. Each of the plates 152 has a recessed pattern adapted to form one of the keys 14 in the top faces of the blocks—a mating pattern to the plates 40 mounted on the bottom palette 38. As shown, the recessed patterned areas 156 in the plates 152 border the apertures 154, with the edges of the areas 156 being beveled, as at 158, to thus correspond to the beveled edges 42 on the bottom palette plates 40. Desirably, the plates 152 are mounted on the lower face of the top palette 142 in an abutting end-to-end relationship such that they form a continuous pattern centrally disposed along the longitudinal axis of the top palette 142, and such that their lateral edges will be receivable against the upper edges of the opposed inner faces of the sidewalls 126 for closing the top of the mold cavity when the top palette is moved into its lowered operative position by the cylinders 135.

A plurality of pins 160 are also mounted on the top palette 142 and project downwardly from its lower face to rest on the sidewall assembly floors 130 when the top pallette is moved downwardly into its operative position. Desirably, the pins 160 hold the lower face of the top pallette 142 slightly above the plane of the floor 130 when said palette is in its lowered position, but the depth of the patterned plates 152 is sufficient to permit them to be received between the opposed sidewalls 126 for closing the top of the mold cavity.

As shown in FIGS. 1 and 5, the cores and end faces of the blocks are produced by a plurality of core-formers 170 and end-formers 175 respectively. To move said core and end-formers to and from their operative positions within the mold cavity, I mount a hydraulic cylinder 180 on each end of the apparatus between the pairs of top palette cylinders 135. Each of the cylinders 180 is supported on the cross braces 35 by brackets 182, and is provided with a downwardly extending ram 184 rigidly connected, as by nuts 185, to a longitudinally extending beam 186. As shown in FIGS. 1 and 3, the beam 186 extends along the longitudinal axis of the apparatus above the top palette 142. Thus, upon actuation of the cylinders 180, the beam 186 will be moved vertically with respect to the mold cavity above the plane of the top palette 142.

As shown in FIG. 5, the ends of the mold cavity are closable by a pair of the end-formers 175 mounted on the beam 186 and adapted to form the end walls of the blocks being produced. When the blocks being produced have a length corresponding to the length of the bottom palette, a pair of the end-formers are employed and are disposed at each end of the series of core-formers 170, as shown in FIG. 5. However, it is sometimes desired to produce a plurality of blocks having lengths shorter than the length of the bottom palette, and in such instances I employ a pair of end-formers 175 at the ends of the series of core-formers 170 in combination with one or more end-formers interposed between the core-formers. These additional end-formers upon being moved into operative position in the mold cavity thus partition said mold cavity into a plurality of shorter cavities. In this manner, each of the additional end-formers forms the end walls of a pair of adjacent cavities, and thus the end walls of a pair of blocks produced in said cavities.

The end-formers 175 are expandable to give the mold cavity, or cavities, a precise fixed, outer, longitudinal dimension. As shown in FIGS. 11–15, each of the end-formers 175 is supported from the beam 186 on a vertically extending shaft 200. The shaft 200 extends upwardly from the end-former through an opening in the top palette 142 with its upper end being received in an opening formed in the lower face of the beam 186. A recess 202 is formed in the shaft at the lower face of the beam 186 and receives a split collar 204 secured to the lower face of the beam 186, as by bolts 206. In this manner, the shaft 200 is rigidly connected to the beam 186 to move said shaft and the end-former 175 carried thereon vertically upon vertical movement of the beam 186, the vertical movement of each end-former being guided by its shaft 200 sliding in an opening in the top palette. In most operations, the end-former shafts 200 have a sufficient length such that upon lowering of the beam 186 the end-formers will precede the core-formers into the mold and will be fully expanded into operative position by the time the core-formers are seated on the bottom palette.

As shown in FIG. 11, the lower end of the shaft 200 is shouldered with a threaded reduced diameter shank upon which a collar 208 is received, said collar and shaft being further connected by a screw 209. The collar 208 is vertically slidable between a pair of spaced opposed thrust blocks 210 having converging, outwardly disposed thrust faces. The opposite or inner faces of each of the thrust blocks 210 are parallel to each other and are provided with vertically extending recesses 212 adjacent each of their ends. Interposed between the opposed pairs of recesses 212 in the thrust blocks 210 is a pair of vertically extending spacer blocks 214 connected, as by bolts 216, to the thrust blocks 210 for movement therewith. The pair of spacer blocks 214 are interconnected at their lower ends by a bottom retainer plate 218 mounted on the lower faces of the thrust and spacer blocks. Overlying the upper ends of spacer blocks 214 and the thrust blocks is a top retainer plate 217 connected to said thrust blocks and having a centrally disposed aperture through which the shaft 200 extends. The lateral extent of the aperture is such that its edges extend inwardly from the inner faces of the thrust and spacer blocks to prevent the collar 208 from moving upwardly beyond said blocks when the shaft 200 is moved upwardly.

A pair of generally U-shaped wedges 220 are disposed against the outer thrust faces of the thrust blocks 210, and have a sufficient length such that they extend beyond the upper and lower ends of the thrust and spacer blocks. This permits the bottom faces of the wedges to seat on the bottom palette 38, with the spacer blocks and wedge plates disposed above said palette, when the end-former is lowered into operative position. In order to permit the wedges to be seated in operative position when the end-former is interposed between a pair of core-formers, the lower ends of said wedges are recessed, as at 221, to fit over one of the bottom palette plates 40. Where the end-formers are used to form the end walls of the mold cavity adjacent the ends of the bottom palette, outside the series of core-formers, the wedges will seat on the bottom palette itself, since the plates 40 are normally mounted on the bottom palette only within the longitudinal extent of the core-formers. As shown in FIG. 14, each of said wedges 220 comprises a web 222 provided with an inner thrust-receiving face 224 sloping inwardly from the top to the bottom face of the wedge toward the center of the end-former and abutting the thrust face on one of the thrust blocks 210. The webs 222 on the wedges are interposed between a pair of legs 226, each of which has an inwardly projecting, obliquely extending key 228 received in a corresponding keyway formed in one of the spacer blocks 214. As indicated in FIG. 11, the keys 228 extend the full length of the wedge so that their upper and lower ends project above and below the upper and lower faces of the thrust and spacer blocks 210 and 214. The opposed pairs of legs 226 on the wedges 220 are also provided with vertically spaced, coaxially aligned openings which slidably carry guide rods 230 for guiding the horizontal movements of the wedges during expansion and collapse of the end-former. A cover plate 232 is mounted on the upper face of each of the wedges 220, with the inner edge of each of said cover plates being recessed for the reception of the shaft 200. Conveniently, the adjacent edges of the plates 232 overlap, as at 234, with said overlapping edges being slidable upon one another during expansion and collapse of the end-former.

Desirably, a face plate 235 is mounted on the outer face of each of the wedges 220, as by countersunk screws 236, extending outwardly from the inner thrust-receiving face 224 of the wedge web 222. As shown, the face plate 235 on the inwardly presented wedge 220 has a key-keyway pattern 240 formed thereon to form the mating key 10 and keyway 12 in the end face of the block being produced. The end-former shown has only one of its face plates provided with a key-keyway pattern, but if the end-former is to be used to partition the mold cavity into a plurality of smaller cavities (as previously described) a pair of such patterned face plates will be mounted on the wedges 220. As shown in FIG. 13, the face plates 235 are also recessed, as at 242, to fit over the projections on the bottom palette plate 40 when the end-former is lowered into operative position.

A plurality of coil springs are also mounted within the end-former 175 to give said end-former the desired expansion and contraction movements upon vertical movement of the shaft 200. One such spring 245 is interposed between the bottom face of the collar 208 and the upper face of the bottom retainer plate 218 interconnecting the opposed spacer blocks 214. A second pair of springs 246 are carried in vertically extending openings formed in the spacer blocks 214. Each of the springs 246 has its upper end disposed against the bottom face of the top retainer plate 217, and its lower end against the medial stretch of a horizontally extending pin 248. Each of the pins 248 is received in aligned openings formed in the webs 222 of the wedges 220 with its medial stretch extending through aligned, vertically extending slots 250 formed in the pair of thrust-blocks 210 and one of the spacer blocks 214.

The operation of one of the end-formers may be described as follows: The shaft 200 is lowered upon the lowering of the beam 186 to lower the end-former into the keyways 127 in the sidewalls 126 of the mold cavity. In such lowered position, the face plates 235 on the end-former will be interposed between the side faces of said keyways. Further lowering of the shaft 200 will cause the end-former 175 to expand in the direction of the longitudinal axis of the apparatus to cause the edges of the face plates 235 to abut the side faces of the keyways 127 to give a precise, fixed dimension between the opposed inner face plates 235 on the pair of end-formers 175 at the opposite ends of the mold cavity.

To effect such expansion, the shaft 200 is forced further downwardly after the end-former is seated on the bottom pallette to cause said downward movement to be transmitted through the collar 208 and the spring 245 to the bottom retainer plate 218 to move said plate downwardly. This downward movement of the plate 218 pulls the spacer blocks 214, and thus the thrust blocks 210 secured thereto, downwardly with the converging thrust faces on said thrust blocks bearing against the thrust-receiving faces 224 on the wedges 220 to force said wedges outwardly into spaced relation to each other. During such expansion, the keys 228 and the guide rods 230 will guide the wedges to keep them in alignment and prevent any binding between said wedges and the spacer blocks.

As the thrust and spacer blocks are moved downwardly with respect to the wedges 220, the slots 250 in said blocks will slide over the pins 248, and the retainer plate 217 will cause the spring 246 to be compressed against the pins 248 held in a fixed vertical position in the openings formed in the wedges 220. This places said springs in compression when the end-former is in its expanded position. Once the wedges 220 have been moved to their fully expanded positions in which the face plates 235 abut the side faces of the keyways 127 in the sidewalls 126 any further downward movement of the shaft 200, or override, will be taken up by the spring 245, causing said spring to be compressed between the collar 208 and the retainer plate 218.

During the expansion of the end-former 175 the overlapping edges 234 of the top plates 232 will slide on each other to bridge the spaces between the adjacent end-former components to prevent aggregate from entering the end-former from the top thereof. Aggregate will be prevented from entering the bottom of the end-former by the palette engaging the bottom faces of the wedges and face plates. Of course, no aggregate can enter from the sides of the end-former which are received in the keyways 127 formed in the sidewall 126.

To collapse the end-former for withdrawing it upwardly from the sidewalls 126, the shaft 200 is moved upwardly under the action of the beam 186. This upward movement of the shaft 200 causes the edges of the upper face of the collar 208 to bear against the top retainer plate 217 to pull the thrust blocks 210 and the spacer blocks 214 connected thereto, in a like direction. As said spacer blocks are moved upwardly, the angularly extending keys 228 interconnecting said spacer blocks to the wedges 220 will pull the wedges inwardly into their collapsed position until the adjacent faces on their legs 226 are disposed in abutting relationship. The springs 246, which were compressed during the expansion of the end-former, act between the rods 248 and the upper plate 217 to urge the spacer blocks 214 and the wedges 220 in opposed vertical directions to overcome any binding forces between said spacer blocks and wedges to further facilitate collapse of the end-former. When the shaft 200 has been withdrawn upwardly a distance sufficient to cause the retainer plate 217 to bear against the lower faces of the cover plates 232, the end-former 175 will thus be drawn upwardly out of the mold cavity.

As illustrated in FIGS. 2 and 3, the plurality of expandable core-formers 170 are supported from, and are vertically movable with, the longitudinally extending beam 186 so that upon vertical movement of said beam by the cylinders 180, the core-formers are moved between an operative position shown in FIG. 2 in which they are disposed between the sidewalls 126 of the mold cavity and a retracted position in which they are disposed above said sidewalls adjacent the lower face of the top palette.

The core-formers are carried from the beam 186 on a plurality of spaced vertically extending shafts 260 mounted on the lower face of said beam and extending downwardly therefrom through the openings 150 and 154 in the top palette and palette plates for connection to the core-formers.

Each of the core-formers 170 is expanded by a rotational camming force. To impart such a rotational camming force to the core-formers, I employ the core-former expansion assembly illustrated in FIGS. 2 and 4. As shown in FIG. 4, the assembly is mounted on a power table 270 carried on the supporting frame adjacent the upper end thereof. Conveniently, the power table has a pair of vertically extending legs 272 extending along its lateral edges to give rigidity thereto, and to serve as a means for mounting said table on the frame members 32 and 33, as by bolts 274.

The rotational camming forces are developed by a pair of hydraulic cylinders 278 swingably mounted on the power table 270 adjacent a pair of its diagonally opposed corners. As shown in FIG. 16, each of the cylinders is provided with a doughnut-shaped yoke 280 at its outwardly disposed end which is swingably received over the shank 281 of a shouldered stud 282 rigidly mounted on the upper face of the power table 270. A cap 284 having an expanded head is threadably received into the upper end of the stud shank to thus retain the cylinder in its swingably supported position on the power table.

As shown in FIG. 4, each of the cylinders 278 has a ram 286 swingably connected to one end of one of a pair of parallel link bars 288 for moving said link bars in opposite longitudinal directions. The pair of link bars 288 are connected to each other by a bank of parallel levers 290 each of which has its opposed ends pivotally connected to the link bars 288, as by pivot pins 292, one such lever being provided for each of the core-formers.

To transmit the forces of the cylinders 278 to the core-formers 170, each of the levers 290 is operatively connected to a vertically extending shaft 300 extending downwardly from said lever to its respective core-former, said shafts extending downwardly through openings formed in the power table, the beam 186, and axially extending openings formed in the shafts 260. As shown in FIG. 17, to effect a connection between the levers 290 and the shafts 300 a block 305 is bolted onto the power table 270 in association with each of the shafts 300 and levers 290. Each of said blocks has an upstanding annularly extending sidewall 308 shouldered, as at 309, at the lower face of the block. A spool 310 is rigidly mounted on the lower face of the lever 290 for rotation therewith in the block opening defined by the sidewall 308. To retain the spool, and thus the lever 290, in fixed vertical position with respect to the block, a rim 311 projects outwardly from the upper end of the spool and is carried on the upper face of the block sidewall. The lower end of the spool is threadably received in a collar 312 adapted to be drawn up on said spool against the block shoulder 309.

The spool 310 has an axially extending opening having a plurality of vertically extending recesses formed therein for the reception of a plurality of splines 316 on the upper end of the shaft 300 for thus transmitting the rotational movements of the lever 290 to said shaft while permitting said shaft to be vertically slidable within the spool upon raising and lowering of its respective core-former by the beam 186. The lever 290 is also provided with a suitable opening to permit the splined upper end of the shaft 300 to move through the plane of said lever. As will be understood, both the cylinders 278 and the spools 310 serve to support the plurality of levers 290 in a fixed horizontal plane above the power table, with the core-former shafts 300 being slidable through the fixed horizontal planes of said levers and power table upon vertical movement of the beam 186.

Thus, to effect a rotation of the core-former shafts 300 to expand the core-formers, the cylinders 278 are actuated to cause their rams 286 to drive the link bars 288 in opposite longitudinal directions, thereby rotating the plurality of levers 290 about the vertical axes of the core-former shafts 300 to the dotted line position shown in FIG. 4. During such movement of the levers 290, the cylinders 278 swing about the axis of the shanks 281 of the studs 282. The rotational movement of the levers 290 is transmitted to the shafts 300 by means of the spline coupling assemblies 305—316 to cause said shafts to be rotated in a like direction. Conversely, a reverse movement of the cylinder rams 286 will move the link bars in opposite longitudinal directions to rotate the levers 290 into the full line position shown in FIG. 4, for effecting a collapse of the core-formers.

The angle of rotation through which the levers 290 are moved is controlled by the length of the stroke of the cylinder rams 286. To further control such rotation, I mount a pair of blocks 298 on the upper face of the power table 270 outwardly from the ends of the bank of levers 290. As shown in FIG. 4, the blocks 298 are mounted at an angle to the longitudinal axis of the apparatus, whereby upon movement of the levers 290 from their normal transversely extending position, the outermost levers will abut said blocks and thus prevent the levers from being rotated through an angle greater than the angle between the blocks 298 and the longitudinal axis of the apparatus.

Each of the core-formers 170 is identical in construction and is expandable upon rotational movement of its shaft 300. As shown in FIGS. 19–31, each of the core-formers comprises four elongated core segments 320 disposed at the corners of the core-former. Each of said core segments has an arcuate inner face 322 provided with a plurality of generally semicylindrically shaped recesses 324 formed at spaced intervals along its vertical axis. As shown in FIG. 20, each of the recesses 324 supports a roller bearing 326 projecting outwardly from the arcuate segment face 322.

The shaft 300 extends downwardly from the power table in the manner previously described, with its lower portion received between the core segments 320. As shown in FIG. 24, a plurality of aligned, vertically spaced cams 328 are rigidly mounted on the lower section of the shaft 300 for rotation therewith. Each of the cams 328 has a plurality of lobes 332 disposed in horizontal alignment with and engageable with a set of the bearings 326 carried in the several core segments. When the core-former is in its collapsed or retracted position, the lobes 332 are disposed out of engagement with the bearings 326, and lie on the transverse axes of the core-former. But upon rotation of the shaft 300, through a 45° angle in a clockwise direction as shown in FIG. 20, the cam lobes 332 are moved into engagement with the bearings 326 to force said bearings, and thus the core segments 320, outwardly on the oblique axes of the core-former.

As shown in FIGS. 27 and 28, the core segments 320 are held in operative position around the cams 328 by means of pivotal linkages. To this end, a pair of arms 333 are rigidly mounted on each of the core segments and project obliquely inwardly from core segment face 322. The inner end of each of the arms 333 is pivotally connected to a link 334 pivotally mounted on a plate 335 mounted on the shaft 300 for rotational movement therewith. As shown in FIG. 24, a pair of the plates 335 are employed, and are conveniently mounted at spaced intervals along the shaft 300. Thus, each of the core segments is operatively connected to the shaft 300 whereby upon rotation of the shaft to expand the core-former, the plates 335 will be rotated and the links 334 will be pivoted outwardly to lie on the oblique core-former axes as shown in FIG. 27. Conversely, as shown in FIG. 28, reverse rotation of the shaft 300 rotates the plates to move the links 334 into positions parallel to the transverse core-former axes, said links pulling the core segments inwardly to their collapsed positions.

As shown in FIG. 20, a plurality of vertically extending face plates 340 having beveled edges 342 are mounted on the core-former to ride against the outer faces of the core segments 320 to prevent the entry of aggregate into the core-former when it is in expanded position. As shown, each of the face plates 340 is connected, as by countersunk screws 343 to a rib 344 extending inwardly between a pair of adjacent core segments. The face plates are held on the core segments by pluralities of horizontally aligned pins 345 slidably received in vertically spaced openings 347 formed in the adjacent faces of adjacent core segments 320 and extending through openings 347 formed in the face plate ribs 344. In this manner the pins 345 hold the face plates on the core-former and keep the several core segments in horizontal alignment during expansion and collapsing movements. As shown in FIG. 26, the ribs 344 are disposed on the transverse core-former axes, and are thus recessed, as at 348, to accommodate the cam lobes 332 when the core-former is in its collapsed position.

When the core-former is expanded, as shown in FIG. 21, the face plates 340 bridge the spaces between the spaced core segments with the result that the aggregate being compressed by the core-former exerts an extremely high counteracting compression force against the face plates tending to buckle them inwardly between the spaced core segments. To overcome this difficulty I mount a second set of cams 346 on the shaft 300 interspaced thereon between the cams 328. As shown in FIGS. 21 and 25, the lobes 349 on the cams 346 are disposed out of alignment with the lobes 332 on the cams 328. In this manner, the cam lobes 349 are disposed on the oblique core-former axes between the bearings 326 when the core-former is in collapsed position, but upon rotation of the shaft 300 in the direction of the arrow in FIG. 20, the cam lobes 349 will be rotated into positions to bear against the inwardly presented faces of the ribs 344 to thus prevent the face plates 340 from buckling inwardly when the core-former is expanded.

As shown in FIG. 22, the core-former is carried on the lower end of the shaft 184 by a spider plate 350 rigidly mounted on the lower end of said shaft and having a lateral extent only slightly smaller than the collapsed core-former. A plurality of T-shaped keyways 351 are provided in the lower face of the spider plate on its oblique axes. Each of the keyways 351 extends inwardly from a corner of the plate and slidably receives a T-shaped key 352 mounted on the upper face of one of the core segments to thus support the core segments on the shaft 184 and guide their expansion and collapsing movements. With the spider plate 350 being held stationary, the keys 352 and keyways 351 thus cooperate with the guide pins 345 to prevent the core segments from rotating during core-former collapse and expansion.

As shown in FIG. 24, the lower ends of the core segments 320 also have T-shaped keys 354 slidably received in corresponding keyways 359 formed along the oblique axes of the upper face of a pilot plate 358. A rectangularly shaped pilot 360 projects downwardly from the pilot plate 358 for reception in the opening 41 in one of the bottom palette plates 40 to guide the core-former into operative position in the mold. The abutting faces of the pilot 360 and the opening 41 prevent the pilot plate from rotating so that the keys 354 and keyways 359 can thus guide the expansion and collapsing movements of the core segments. Conveniently, the edges of the spider and pilot plates are beveled, as at 361, to screed any aggregate from the ends of the core segments when said core segments are moved from expanded to collapsed positions.

As shown in FIG. 24, inwardly extending trapezoidal shaped top and bottom cover plates 362 and 364 respectively are connected to the upper and lower ends of each of the face plates 340. The two sets of cover plates 362 and 364 are provided with beveled edges 366, and extend inwardly to abut the shaft 184 and pilot 360 respectively. As shown in FIG. 24, the cover plates 362 have downwardly presented T-shaped keys 368 that are slidably received in a plurality of T-shaped keyways 370 on the transverse axes of the upper face of the spider plate 350. Similarly, the lower cover plates 364 have T-shaped keys 372 slidable in T-shaped keyways 374 on the transverse axes of the lower face of the pilot plate 358. Thus, during expansion and collapse of the core-former, the cover plates 362 and 364 will slide along the spider and pilot plates with their mating keys and keyways guiding their sliding movements and keeping the face plates centered on the lateral core-former faces.

The operational sequence of the core-formers illustrated in FIGS. 19–31 is as follows: The bank of the core-formers 170 are lowered into operative position in the mold cavity by means of the cylinders 180 acting through the beam 186; the core-former pilots 360 being received in the bottom plate openings 41 to guide the core-formers into position on the bottom palette plates 40. With the core-formers thus positioned in the mold, the bank of levers 290 are rotated in the manner previously described to rotate the core-former shafts 300 through an angle of 45°. Such rotational movement of the shafts 300 causes the cam lobes 332 on the cams 328 to bear against the roller bearings 326 to force the core segments outwardly along the oblique axes of the core-former into expanded position. Simultaneously, the cam lobes 349 on the cams 346 are rotated into positions of engagement with the ribs 344 on the face plates 340 to support said face plates between the adjacent pairs of spaced core segments 320.

During the rotational movement of the shaft 300, the core segments are prevented from being rotated therewith by the core segment keys 352 and 354 sliding in their respective keyways in the spider and pilot plates 350 and 358. This guiding action of the core segment keys is further enhanced by the pins 345 slidably connecting the pairs of adjacent core segments.

As will be understood, the face plates 340 bridge the spaces between the spaced pairs of adjacent core segments along the side faces of the core-former to prevent the entry of aggregate therein. And the top and bottom cover plates 362 and 364 cooperating with the spider plate 350 and pilot plate 358 respectively prevent the entry of aggregate into the core-former from the top and bottom thereof.

To collapse the core-formers, the cylinders are actuated to rotate the bank of levers 290 in an opposite direction until they lie in their normal transversely extending position. During such movement, the cams 328 are rotated to position their lobes 332 on the transverse axes of the core-former, and the cams 346 are rotated to position their lobes 349 on the oblique core-former axes in the spaces between the roller bearings 326 carried in the core segments 320.

As the shaft 300 is rotated in a core-former collapsing direction the plates 335 will be rotated to pivot the links 334 inwardly as shown in FIG. 28, to pull the core segments 320 inwardly toward the vertical axis of the core-former, the movements of the core segments being guided by the keys 352 and 354. This collapsing movement of the core segments 320 causes their outer faces to slide along the inner faces of the face plates with the beveled edges 342 thereof screeding any aggregate from the outer faces of the core segments. Similarly, the beveled edges 366 on the top and bottom cover plates 362 and 364 will screed any aggregate from the plates 350 and 358 respectively. When each of the core-formers has been fully collapsed into the position shown in FIG. 19, they may be raised into their retracted position by actuation of the cylinders 180 to raise the beam 186. As the beam 186 is raised, the shafts 184 acting through the spider plates 362 will cause the core-formers 170 to be raised with said beam. The upward movement of the core-formers will be transmitted to their shafts 300 by the pilot plates 358 bearing against the bottom faces of the lowermost cams 328 carried on said shafts.

In order to introduce the aggregate into the mold cavity, I provide a pair of aggregate buckets movable toward and away from the longitudinal axis of the mold cavity on the floors 130 on the sidewall assemblies. Each of these aggregate buckets is identical in construction and operation, and only one will be described. As best shown in FIGS. 32 and 33, the aggregate bucket comprises an elongated frame having a floor 400, end walls 402, a back cover 404, and a top cover 406 supported above the floor 400 on vertically extending posts 408. All of these frame components of the bucket may be welded together and cross-braced in any convenient manner.

Mounted on the bucket at the inner edges of the top cover 406 and floor 400 is a hopper 410 extending the length of the aggregate bucket. As shown, the rear wall 412 of the hopper 410 slopes inwardly from the top cover to the lower face of the bucket floor 400 so that it will be slidable over the floor 130. The forward or inner wall 415 of the hopper is disposed in a vertical plane and comprises a plurality of spaced, vertically extending recesses 416, each of which corresponds in size and shape to one-half of one of the core-formers 170. The lateral ends of the aggregate bucket and its hopper 410 terminate short of the end-formers and thus no recesses are necessary in the forward hopper wall 415 to accommodate the end-formers 175. Thus, when the pair of aggregate buckets are moved inwardly into operative position the inwardly projecting faces of the bucket walls 415 will abut each other along the longitudinal axis of the apparatus. The forward wall 415 is mounted on the hopper and the aggregate bucket as by connecting the ends of said wall to the bucket sidewalls 402, and by a plurality of vertically extending partitions 418 welded to the forward hopper wall 415 and the sloping hopper rear wall 412. The space between the lower edges of the forward hopper wall 415 and the inclined rear wall 412 is, of course, open to permit the discharge of aggregate into the mold cavity upon positioning of the aggregate bucket in operative position, as shown in FIG. 33.

The aggregate bucket is movable to and from this operative position on sets of rollers 420 carried in roller supports 422 mounted on the sidewall assembly floor 130 adjacent the ends thereof. The inner ends of the supports 422 are disposed outside the extent of the vertical movements of the top palette so as not to interfere with the top palette being lowered into its operative position on the mold sidewalls 126. Each set of the rollers 420 tracks in a roller guide 424 mounted on one of the end walls 402 of the aggregate bucket and provided with a pair of spaced, outwardly extending flanges 425 in which the rollers 420 are received. A gear rack 428 is mounted on the lower flange 425 of each of the roller guides 424 to dispose said gear racks normal to the longitudinal axis of the apparatus with their teeth presented downwardly. Meshing with the gear racks 428 are a pair of gears 430 adapted to drive said gear racks, and thus the aggregate bucket, laterally of the apparatus toward and away from the longitudinal axis thereof. As shown in FIG. 32, the gears 430 are driven by a pair of drive shafts 432 journaled at their outer ends in pillow blocks 434 mounted on supports 436 secured to one of the back-up beams 60. The inner ends of the drive shafts are operatively connected to a reversible drive motor 438 centrally mounted on the backup beam 60. Desirably, the motor 438 drives the gears 430 both in a clockwise and counterclockwise direction for moving the aggregate bucket toward and away from the longitudinal axis of the apparatus, and may be adjusted so that it will drive the gears 430 through a predetermined arc of rotation to control the extent of the lateral movement of the aggregate bucket.

In order to discharge the aggregate out of the hoppers 410, I provide an agitator system as illustrated in FIGS. 4 and 32. As shown, I mount a plurality of blocks 440 on the aggregate bucket floor 400 which support a plurality of pillow blocks 442 in which a pair of drive shafts 444 are journaled. The inner ends of the drive shafts are operatively connected to a motor 445 mounted on the bucket floor 400 adjacent the longitudinal center thereof. Also mounted at spaced intervals on the floor 400 are a plurality of pillow blocks 446 mounted on blocks 448 and rotatably supporting a cam shaft 450 extending the length of the aggregate bucket. The cam shaft 450 is rotatably driven by the drive shafts 444 by means of a pair of chain drives 454.

As shown in FIG. 34, a plurality of cams 455 having circumferentially extending sidewalls 456 are rigidly mounted at spaced intervals along the cam shaft 450 for rotational movement therewith. Preferably, one of said cams is mounted on the cam shaft 450 in a line with each of the recesses 416 formed in the forward wall of the hopper 410. A generally vertically extending connecting rod 460 is mounted on each of the cams 455 between the sidewalls 456 thereof. As shown, the lower end of each of the connecting rods 460 comprises a shouldered yoke 462 receivable against the upper half of the cam 455 and a web 464 receivable against the lower half of the cam 455 and connected to the yoke 462, as by bolts 465, for rotatably mounting the connecting rod onto the cam 455. The upper end of each of the connecting rods 462 is pivotally connected to the outer end of a lever arm 468, as by a bolt 469. The lever arm 468 extends inwardly from its connection to the connecting rod through a slot 470 cut in the inclined rear wall 412 of the aggregate bucket to dispose the inner end of said lever arm in the hopper 410. This inwardly disposed end of the lever arm is pivotally connected, as by a bolt 472, to the yoke 474 of an agitator arm 475 extending downwardly in the hopper 410. The agitator arm 475 is provided with a plurality of laterally extending fingers 476 mounted at spaced intervals thereon and having upturned ends 478 for forcing the aggregate out of the hopper into the mold cavity.

As shown in FIG. 35, the lever arms 468 are pivotally supported from the top cover 406 of the bucket. To this end, a longitudinally extending brace 480 is mounted to the underside of the bucket cover 406 adjacent its connection to the rear hopper wall 412. A bracket 482 is mounted on the brace 480, and has a plurality of spaced pairs of depending fingers 484 connected to said bracket by bolts 485. The several lever arms are received between the pairs of fingers 484 and are pivotally supported therebetween by bolts 488 extending through openings formed in the fingers and the lever arms.

Thus, in operation, the opposed pair of aggregate buckets are moved inwardly on the rollers 420 by the gears 430 and gear racks 428 until the inwardly disposed faces on the forward hopper walls 415 abut each other along the longitudinal axis of the mold cavity. In this operative position, the open lower ends of the hoppers 410 will overlie the mold cavity for discharging the aggregate into said cavity. With the buckets thus positioned, the drive and cam shafts 444 and 450 are driven by the motor 445 to cause the cams 455 to move the connecting rods in a generally vertical direction. This vertical movement of the connecting rods 460 pivots the lever arms 468 about the axes of the bolts 488 connecting them to the bucket covers 406, thereby moving the agitator arms 475 in a generally vertical plane in the hoppers 410. Such vertical movement of the agitator arms 475 in the hoppers 410 downwardly through the open space provided between the hopper front and rear walls 415 and 412 respectively to fill the mold cavity. This action of the agitator arms 475 discharges the aggregate into the mold cavity in a manner such that said mold cavity is provided with a uniform aggregate fill. After filling the mold cavity, the buckets may be withdrawn toward a laterally retracted position by the gears 430 and gear racks 428, with the buckets moving laterally outwardly on the rollers 420. As the buckets are moved laterally outwardly the lower edges of the hopper walls 412 and 415 will screed the upper faces of the floors 130 to remove any aggregate therefrom.

Although the agitator arms 475 in the hoppers 410 produce a complete and substantially uniform fill of the mold cavity, the uniformity of the aggregate fill may be enhanced by the provision of agitating means operable against the bottom palette 38. To this end, I mount a plurality of agitators 492 on the underside of the base 22, as by brackets 494. As shown in FIG. 3, each of the agitators 492 has a hammer 496 extending upwardly through the openings formed in the base and channel guide, so that upon actuation of the agitators the hammers 496 will strike the lower face of the bottom palette 38 to settle the aggregate discharged into the mold cavity by the arms 475. Thus, the agitators 492 act in combination with the agitators in the hoppers 410 to settle the aggregate in the mold to produce a uniform fill and to remove a substantial portion of the entrained air from the aggregate.

The operation of my apparatus may be briefly summarized as follows: The bottom palette 38 is slid along the palette guide 25 until it is disposed in an operative position between the end frames 32 and 33 with the openings 41 in the plates 40 in alignment with the openings formed in the base 22 and palette guide 25. The hydraulic cylinders 96 are then actuated to drive the wedges 90 in the sidewall assemblies longitudinally of the apparatus to move the sidewalls inwardly into their operative positions overlying the lateral edges of the bottom palette 38. This inward movement of the sidewalls is guided and controlled by the guide rods 102 which are adjustable to control the spacing between the opposed faces of the sidewalls 126 to thus define the width of the blocks to be produced. With the sidewalls 126 and the bottom palette 38 disposed in their operative positions, the cylinders 180 are actuated to lower the beam 186 for positioning the end-formers 175 and the core-formers in their operative positions in the mold in which they are seated on the bottom palette 38 and the bottom palette plates 40 respectively. Preferably, the end-formers precede the core-formers into the mold cavity so that they will be operatively positioned and expanded at the time the core-formers are seated on the bottom palette. This causes the end-formers to be collapsed subsequent to the collapse of the core-former so that any re-expansion of the aggregate will take place only in the cores 15 and will not affect the outer dimensions of the block produced. The degree of expansion of the end-formers 175 is controllable in the manner previously described so that said end-formers, which form the end faces of the block being produced, will give said block a precise fixed length.

After the end and core-formers have been seated on the bottom palette 38 and its plates 40 between the sidewalls 126, the mold cavity is thus defined so that the aggregate used in forming the block may be introduced into said cavity. This is accomplished by moving the aggregate buckets inwardly toward the longitudinal axis of the apparatus on their rollers 420 until their hoppers 410 are disposed in operative position overlying the mold cavity. In this position, the aggregate is discharged from the hoppers 410 by the series of agitator arms 475 acting in combination with the agitators 492 mounted on the lower face of the base 22. Preferably, the mold cavity is filled with aggregate up to the top of the sidewalls 126. With the cavity thus filled, the buckets are moved outwardly on the rollers 120 to their retracted positions. The aggregate is, of course, prevented from exiting the hoppers 410 when the buckets are in their retracted positions, or during the lateral movements to and from said operative positions, by the open lower ends of the hopper 410 riding against the sidewall assembly floors 130.

The mold cavity filled with aggregate is then ready to be closed by the top palette 142 which is lowered into position by the cylinders 135. As the top palette 142 approaches its lowered operative position, the edges of the top palette plates 152 will slide against the opposed inner faces of the sidewalls 126 to thus close the top of the mold cavity. The downwardly extending pins 160 on the top palette 142 will engage the sidewall assembly floors 130 to hold said top palette in a plane slightly above the plane of the floors 130. This lowering of the top palette 142 into its operative position will, of course, cause the plates 152 to effect a slight compression of the aggregate in the mold cavity.

With the top palette disposed in its operative position, the mold cavity is thus completely closed, and the aggregate therein may be compressed by expanding the core-formers 170 in the manner previously described. In summary, such expansion of the core-formers is effected by actuating the cylinders 278 to drive the link bars 288 and the series of levers 290 into their dotted line position shown in FIG. 4. The angle of rotation of the levers 290 is controlled and limited by the strokes of the cylinders 278 and by the blocks 298 mounted on the power table 270. This rotational movement of the levers 290 causes the several core-former shafts 300 to rotate in the core-former supporting shafts 184 to rotate the cams in the core-formers in the manner previously described for effecting an expansion of said core-formers, whereby each of said core-formers will expand laterally outwardly within the mold cavity to compress the aggregate therein. As soon as the core-formers 170 have been fully expanded, the cylinders 278 are actuated to move the link bars 288 and levers 290 into the full line position shown in FIG. 4 to cause the core-former shafts 300 to rotate into a core-former collapsed position as previously described.

After the core-formers have been fully collapsed, the top palette 142 is moved upwardly into its retracted position by the cylinders 135. The end and core-formers are then withdrawn from the mold by the cylinders 180 acting through the beam 186. Where the end-formers 175 are positioned with respect to the core-formers 170 so that they precede the core-formers into the mold cavity, the initial raising of the beam 186 will first cause the end-formers to be retracted into their collapsed positions so that their opposed, inwardly disposed face plates are moved longitudinally outwardly away from the end faces of the block. After the end-formers are thus collapsed, further raising of the beam 186 will cause the end and core-formers to be fully retracted from the mold cavity into an elevated position above said cavity. The sidewalls 126 are then moved laterally outwardly by the wedges 90, and the block with the aggregate in a self-supporting state may be removed from the apparatus on the bottom palette 38 by sliding said bottom palette outwardly along the palette guide 25. The time required to complete the entire sequence of steps just described is in the order of about forty seconds. It should be noted that in withdrawing the several components of the mold away from the block, none of said components is slid along any of the block faces. Rather, each of the components is moved directly outwardly from the block face which it forms, thereby reducing the wear on said components.

At the time the block is removed from the apparatus, it will be in a partially cured, self-supporting state, and may be removed to a conventional curing room to cure the aggregate into a rigid condition. When the block is removed from the apparatus, the aggregate from said block will have little or no tendency to re-expand, but if any such re-expansion does occur, it will occur in the cores 15 so that it will not alter the outer dimensions of the blocks.

I claim as my invention:

1. An apparatus for making cored building blocks, comprising an elongated base and supporting frame, a mold carried on said base and defining the outer faces of the blocks to be produced, the bottom of said mold having a plurality of spaced openings formed therein along the longitudinal mold axis, a plurality of expandable core-formers disposed in alignment with the longitudinal mold axis and insertable into the mold for forming the block cores, said core-former upon insertion in said mold having their upper and lower faces abutting the portions of the mold defining the upper and lower block faces and having projections received in said mold openings, said core-formers being carried on a plurality of pairs of shafts operatively connected to said supporting frame with one of the shafts in each pair of shafts being rotatable for imparting radial thrust to said core-formers for effecting a uniform radial expansion of said core-formers throughout their lengths to compress the aggregate in the mold, and means carried on said supporting frame above the core-formers for simultaneously rotating said one shaft in said pairs of shafts through equal angles of rotation.

2. An apparatus for making cored building blocks, comprising a base and supporting frame, an elongated mold carried on said base and defining the outer faces of the blocks to be produced, the top and bottom of said mold having a plurality of aligned spaced openings formed therein along the longitudinal mold axis, a plurality of expandable core-formers movable with respect to said mold between a retracted position out of said mold and an operative position in said mold with their upper and lower faces abutting the upper and lower block-forming faces of said mold and with projections formed thereon being received in said openings in the bottom of said mold, a power table mounted on said supporting frame above said core-formers, a plurality of shafts operatively interconnected to said core-formers and power table, said shafts being axially movable with respect to said power table and mold for moving said core-formers into and out of said mold and rotatable for imparting radial thrust forces to the core-formers for effecting a uniform lateral expansion of said core-formers throughout their lengths to compress the aggregate in the mold, and means on said power table for simultaneously rotating said shafts through equal angles of rotation.

3. An apparatus for making cored building blocks as set forth in claim 2 with the addition that said projections on said core-formers are engageable with the walls of the openings in the bottom of said mold for holding said core-formers in a fixed orientation with respect to the mold axes during rotation of said shafts.

4. An apparatus for making cored building blocks, comprising a base and a supporting frame extending upwardly therefrom, a mold carried on said base and defining the outer faces of the blocks to be produced, said mold comprising top and bottom palettes movable vertically and horizontally respectively and held in spaced vertical relation to each other by opposed pairs of block end and sidewall-forming members, said sidewall-forming members being movable normal to the longitudinal mold axis and said endwall forming members being vertically movable between a retracted position out of engagement with the other mold components and an operative position abutting said sidewall-forming members and said top and bottom palette, a plurality of expandable core-formers below the plane of the top palette and vertically movable between a retracted position above said mold and an operative position in said mold with their top and bottom faces abutting the upper and lower block-forming faces of said mold, a power table mounted on said supporting frame above the core-formers and top palette, a plurality of shafts operatively interconnecting said core-formers and means on said power table for simultaneously rotating said shafts through equal angles of rotation to impart radial thrust forces to said core-formers to effect a uniform lateral expansion of core-formers throughout their lengths to compress the aggregate in the mold, said shafts being vertically movable with respect to said power table and mold and moving said core-formers into and out of said mold.

5. An apparatus for making cored building blocks, comprising a base and supporting frame, a mold carried on said base and defining the outer faces of the blocks to be produced, a beam carried from said supporting frame above the mold and movable toward and away from said mold, a plurality of expandable core-formers interconnected to said beam for movement therewith, said core-formers upon movement of the beam toward the mold being inserted into said mold for forming the block cores and withdrawn from said mold upon movement of said beam in an opposite direction, a power table fixedly mounted on the supporting frame above said beam, and a plurality of shafts extending through openings in said beam and its connection to the core-formers to operatively connect the core-formers to means on said power table simultaneously rotating said shafts through equal angles of rotation to impart radial thrusts to the core-formers to effect a uniform expansion of the core-formers throughout their lengths to compress the aggregate in the mold, said shafts being slidable through the planes of the power table and said means during the movement of the core-formers with said beam.

6. An apparatus for making cored building blocks, comprising a base and a supporting frame, a mold carried on said base and defining the outer faces of the blocks to be produced, a beam carried on said supporting frame above the mold and movable toward and away from said mold, a first set of shafts connecting a plurality of expandable core-formers to said beam in spaced relation thereto and for movement therewith, said core-formers being insertable in the mold to form the block cores upon movement of the beam toward the mold and withdrawn from said mold upon movement of said beam in an opposite direction, a power table mounted on the supporting frame above said beam, a second set of shafts extending through said beam and first set of shafts to operatively connect the core-formers and power table, said second set of shafts being rotatable with respect to said first set of shafts and said core-formers for imparting radial thrusts to said core-formers for effecting a uniform lateral expansion of said core-formers throughout their lengths to compress the aggregate in the mold, said core-formers being slidably connected to said first set of shafts whereby said core-formers are expandable outwardly with respect to the axes of said first set of shafts during core-former expansion, and means on said power table for simultaneously rotating said second set of shafts through equal angles of rotation.

7. An apparatus for making cored building blocks, comprising a base and supporting frame, an elongated mold carried on said base and defining the upper, lower, and side faces of the blocks to be produced, a beam carried on said supporting frame above the mold and movable toward and away from said mold, pluralities of expandable end and core-formers carried on said beam and movable therewith between a retracted position above said mold and an operative position in said mold to form the end faces and cores of said blocks, each of said end-formers being insertable into the mold to abut the mold portions defining said upper, lower, and side faces of the blocks, means interconnecting said end-formers to said beam and expanding said end-formers only with respect to the longitudinal axis of said mold upon insertion of said end-formers into said mold, said means disposing said end-formers below the plane of said core-formers when said end and core-formers are disposed out of mold, whereby said end-formers are insertable into said mold and expanded prior to said core-formers being disposed in said mold and whereby said core-formers may be collapsed prior to collapse of said end-formers, a power table mounted on the supporting frame above said beam, and a plurality of shafts extending through said beam and its connections to the core-formers to operatively connect the core-formers to means on said power table for simultaneously rotating said shafts through equal angles of rotation in one direction to impart radial thrust forces to said core-formers to effect uniform lateral expansion of the core-formers throughout their lengths to compress the aggregate in the mold and for rotating said shafts in an opposite direction whereby said core-formers may be collapsed.

8. An apparatus for making cored building blocks, comprising a base and supporting frame, a mold carried on said base and defining the upper, lower, and side faces of the blocks to be produced, a beam carried by said supporting frame above the mold and movable toward and away from said mold, pluralities of expandable end and core-formers carried on said beam and movable therewith between a retracted position above said mold and an operative position in said mold to form the end faces and cores of said blocks, means interconnecting said end-formers to said beam for uniformly expanding said end-formers throughout their lengths upon movement of the beam to seat the core-formers in operative position in the mold and for collapsing said end-formers upon movement of said beam in a direction to withdraw the core-formers from the mold, said mold having means for guiding the end and core-formers into said operative positions and means for limiting the expansion of said end-formers to give the mold a fixed length, a power table mounted on said supporting frame above said beam, and a plurality of shafts operatively connecting said core-formers to means on said power table for simultaneously rotating said shafts in one direction through equal angles of rotation to impart radial thrusts to said core-formers to effect a uniform expansion of the core-formers along their lengths to compress the aggregate in the mold and rotating said shafts in an opposite direction whereby said core-formers may be collapsed, said means interconnecting said end-formers to said beam disposing said end-formers below said core-formers when said end and core-formers are withdrawn from said mold whereby said end-formers are insertable into said mold and expanded prior to said core-formers being disposed in operative position in said mold and whereby said core-formers may be collapsed prior to collapse of said end-formers.

9. An apparatus for making cored building blocks, comprising a base and supporting frame, a mold carried on said base and defining the outer faces of the blocks to be produced, a plurality of expandable core-formers carried from the supporting frame and movable to and from operative positions within the mold for forming the cores in the block to be produced, means for moving said core-formers to and from said operative position, a power table mounted on said supporting frame above the mold, thrust means on said power table rotatable in a fixed plane normal to the plane of movement of the core-formers to and from their operative positions, and a plurality of shafts interconnecting the core-formers and said thrust means, said shafts being operatively connected to said core-formers for movement therewith to and from said operative position and slidably and rotatably connected to said thrust means for rotational movement with an axial movement with respect to said thrust means, said thrust means simultaneously rotating said shafts through equal angles of rotation in one direction to effect a uniform expansion of the core-formers throughout their lengths for compressing the aggregate in the mold and rotating said shafts in an opposite direction whereby said core-formers may be collapsed.

10. An apparatus for making cored building blocks, comprising a base and supporting frame, a mold carried on said base and defining the outer faces of the blocks to be produced, a plurality of expandable core-formers carried from the supporting frame and movable to and from operative positions within the mold for forming the cores in the block to be produced, a power table mounted on said supporting frame above the mold, a plurality of parallel levers rotatably mounted on said power table, a pair of parallel link bars pivotally connected to said levers to effect a simultaneous rotation thereof, a plurality of shafts interconnecting the core-formers and said levers, said shafts being operatively connected to said core-formers for movement therewith to and from said operative position and slidably and rotatably connected to said levers for rotational movement with an axial movement with respect to said levers, said levers simultaneously rotating said shafts through equal angles of rotation in one direction to impart radial thrust forces to the core-formers to effect a uniform expansion of the core-formers throughout their lengths for compressing the aggregate in the mold and rotating said shafts in an opposite direction whereby said core-formers may be collapsed, and means for rotating said levers.

11. In an apparatus for making cored building blocks, a base, a supporting frame extending above said base, a longitudinally extending block mold carried on said base, a power table mounted on the supporting frame above said mold and having a plurality of operatively connected thrust members mounted thereon, means on said power table for simultaneously rotating said thrust members in a fixed plane through equal angles of rotation, a beam carried on said supporting frame between said power table and the mold and movable toward and away from said mold, a first set of shafts interconnecting said beam and a plurality of expandable core-formers whereby said core-formers are movable with said beam to and from operative positions in the mold in which they form the cores of the block being produced, each of said core-formers comprising a plurality of elongated core segments movable with respect to each other, a rotatable shaft having its lower end interposed between said core segments and extending upwardly therefrom through one of the shafts in said first set of shafts for connection to one of said thrust members for rotation therewith, said one of said shafts being axially slidable with respect to said one of said thrust members upon movement of said core-formers with said beam, cam means on said rotatable shaft operative upon rotation thereof in one direction to force said core segments into spaced relation to each other to expand the core-former to compress the aggregate within the mold, means operatively interconnecting said core segments and moving them toward each other upon rotation of said rotatable shaft in an opposite direction, a plurality of face plates on said core segments bridging the spaces between said core segments when they are disposed in spaced relation to each other, and means interconnecting said core segments to one of said first set of shafts for mounting the core-former thereon.

References Cited in the file of this patent

UNITED STATES PATENTS

| | | |
|---|---|---|
| 718,700 | Crosby et al. | Jan. 20, 1903 |
| 1,167,797 | Clawson | Jan. 11, 1916 |
| 1,637,708 | Porter | Aug. 2, 1927 |
| 1,676,325 | Doll | July 10, 1928 |
| 2,030,724 | Smith | Feb. 11, 1936 |
| 2,091,973 | Fessler et al. | Sept. 7, 1937 |
| 2,111,562 | Hughson | Mar. 22, 1938 |
| 2,298,006 | George | Oct. 6, 1942 |
| 2,315,634 | McCall | Apr. 6, 1943 |
| 2,524,744 | Zevely | Oct. 3, 1950 |
| 2,542,874 | Locatelli | Feb. 20, 1951 |
| 2,739,364 | Clemans | Mar. 27, 1956 |
| 2,769,203 | Wood | Nov. 6, 1956 |
| 2,837,807 | McGraw | June 10, 1958 |
| 2,892,339 | Flower et al. | June 30, 1959 |
| 2,964,820 | Olson et al. | Dec. 20, 1960 |